(12) United States Patent
Beach et al.

(10) Patent No.: US 8,510,645 B2
(45) Date of Patent: Aug. 13, 2013

(54) METHOD OF APPLYING A FUNCTION TO A DATA SET

(75) Inventors: Joel Timothy Beach, Surry Hills (AU); Alexander Will, Randwick (AU)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 11/538,558

(22) Filed: Oct. 4, 2006

(65) Prior Publication Data
US 2007/0112724 A1 May 17, 2007

(30) Foreign Application Priority Data
Oct. 10, 2005 (AU) ................................ 2005220268

(51) Int. Cl.
*G06F 17/30* (2006.01)
(52) U.S. Cl.
USPC .......................................... 715/212; 715/219
(58) Field of Classification Search
USPC ...................... 707/2, 101, 729; 715/212–220
See application file for complete search history.

(56) References Cited

U.S. PATENT DOCUMENTS

| | | | | |
|---|---|---|---|---|
| 5,537,525 | A * | 7/1996 | Gotoh et al. | 715/223 |
| 5,604,854 | A * | 2/1997 | Glassey | 715/209 |
| 5,632,009 | A * | 5/1997 | Rao et al. | 715/201 |
| 6,526,399 | B1 | 2/2003 | Coulson et al. | 707/1 |
| 6,626,959 | B1 * | 9/2003 | Moise et al. | 715/210 |
| 6,628,312 | B1 | 9/2003 | Rao et al. | 345/853 |
| 7,143,339 | B2 * | 11/2006 | Weinberg et al. | 715/212 |
| 2002/0095399 | A1 * | 7/2002 | Devine et al. | 707/1 |
| 2002/0116417 | A1 * | 8/2002 | Weinberg et al. | 707/517 |
| 2003/0108849 | A1 * | 6/2003 | Hodges | 434/236 |
| 2003/0226105 | A1 * | 12/2003 | Waldau | 715/503 |
| 2005/0060300 | A1 | 3/2005 | Stolte et al. | 707/3 |
| 2005/0179684 | A1 * | 8/2005 | Wallace | 345/419 |
| 2006/0048045 | A1 * | 3/2006 | Lehenbauer et al. | 715/509 |
| 2006/0129929 | A1 * | 6/2006 | Weber et al. | 715/538 |
| 2007/0061344 | A1 * | 3/2007 | Dickerman et al. | 707/100 |
| 2007/0061369 | A1 * | 3/2007 | Folting et al. | 707/200 |

OTHER PUBLICATIONS

Jinjer Simon, Excel 2000 in a Nutshell, Pub Date: Aug. 2000, ISBN: 1-56592-714-1.*
Joe Kraynak, Absolute Beginner's Guide to Microsoft Office Excel 2003, Pub Date: Sep. 11, 2003, ISBN-10: 0-7897-2941-5.*
Computer Images, Nov. 2002.*
Fairwinds, Mr.Excel.com, Jan. 2004, http://www.mrexcel.com/archive2/63500/73502.htm.*
McFedries, Formulas and Functions with Microsoft Excel 2, Pub Date: Jun. 11, 2004, Print ISBN-10: 0-7897-3153-3.*

(Continued)

*Primary Examiner* — Mahesh Dwivedi
(74) *Attorney, Agent, or Firm* — Fitzpatrick, Cella, Harper & Scinto

(57) ABSTRACT

Disclosed is a method of applying a function to a set of data. Initially a tabular representation of the set of data is displayed, the representation comprising a plurality of columns. The data in the representation is grouped in each column based upon an order of the at least one column in the tabular representation. The method also generates a new column of data comprising a transform of existing column data contained in the tabular representation, wherein transform data within the new column depends upon a grouping context of the existing column data. Desirably the method further repositions the new column of data in the tabular representation and updates the transform data in the new column in accordance with a destination grouping context of a destination position of the new column in the tabular representation.

11 Claims, 31 Drawing Sheets

(56) References Cited

OTHER PUBLICATIONS

Article entitled "Descriptive Measures: Excel and Equations" by BA201, Copyright 2001.*
Article entitled "Excel 2003: Pivot Tables Learning Guide", by ITS, dated Aug. 2, 2005 (Applicable to MS Excel 2003).*
Article entitled "Using Excel 2000", by PC Review, dated May 26, 2004 (Applicable to MS Excel 2000).*
"PivotTable Reports 101", Microsoft Excel™, Microsoft Corporation, USA, 9 sheets.
Hanrahan, P. et al., "Tableau Software: Visual Analysis for Everyone", © 2007 Tableau Software, Incorporated, pp. 1-26.

* cited by examiner

| Country | City | FirstName | LastName | PurchaseAmount |
|---|---|---|---|---|
| Australia | Melbourne | John | Martin | 32 |
| | Sydney | John | Smith | 255 |
| | | John | Smith | 171 |
| | | John | Smith | 713 |
| | | Alexander | Carn | 45 |
| | | Alexander | Carn | 167 |
| China | Beijing | Peter | Fraser | 578 |
| | | Peter | Fraser | 568 |
| England | London | Colin | Howell | 233 |
| | | Colin | Howell | 132 |
| U.S.A | New York City | Sean | martin | 123 |
| | | Sean | Martin | 23 |
| | | Sean | martin | 67 |
| | Seattle | Alexander | Brown | 23 |
| | | Christopher | Brown | 67 |

Fig. 6

|   |   |   |   | 1700 |
|---|---|---|---|---|
| 1705 | 1710 |   |   | 1730 |

| FirstName | LastName | Country | City | PurchaseAmount |
|---|---|---|---|---|
| Alexander | Brown | U.S.A | Seattle | 23 |
|  | Carn | Australia | Sydney | 45 |
|  |  | Australia | Sydney | 167 |
| Christopher | Brown | U.S.A | Seattle | 67 |
| Colin | Howell | England | London | 233 |
|  |  | England | London | 132 |
| John | Martin | Australia | Melbourne | 32 |
|  | Smith | Australia | Sydney | 255 |
|  |  | Australia | Sydney | 171 |
|  |  | Australia | Sydney | 713 |
| Peter | Fraser | China | Beijing | 578 |
|  |  | China | Beijing | 568 |
| Sean | martin | U.S.A | New York City | 123 |
|  |  | U.S.A | New York City | 23 |
|  |  | U.S.A | New York City | 67 |

| LastName | Country | City | PurchaseAmount |
|---|---|---|---|
| Brown | U.S.A | Seattle | 23 |
|  | U.S.A | Seattle | 67 |
| Carn | Australia | Sydney | 45 |
|  | Australia | Sydney | 167 |
| Fraser | China | Beijing | 578 |
|  | China | Beijing | 568 |
| Howell | England | London | 233 |
|  | England | London | 132 |
| Martin | Australia | Melbourne | 32 |
|  | U.S.A | New York City | 123 |
|  | U.S.A | New York City | 23 |
|  | U.S.A | New York City | 67 |
| Smith | Australia | Sydney | 255 |
|  | Australia | Sydney | 171 |
|  | Australia | Sydney | 713 |

Fig. 18

| FirstName | LastName | sum_PurchaseAmount | Country | City | PurchaseAmount |
|---|---|---|---|---|---|
| Alexander | Brown | 23 | U.S.A | Seattle | 23 |
|  | Carn | 212 | Australia | Sydney | 45 |
|  |  |  | Australia | Sydney | 167 |
| Christopher | Brown | 67 | U.S.A | Seattle | 67 |
| Colin | Howell | 365 | England | London | 233 |
|  |  |  | England | London | 132 |
| John | Martin | 32 | Australia | Melbourne | 32 |
|  | Smith | 1139 | Australia | Sydney | 255 |
|  |  |  | Australia | Sydney | 171 |
|  |  |  | Australia | Sydney | 713 |
| Peter | Fraser | 1146 | China | Beijing | 578 |
|  |  |  | China | Beijing | 568 |
| Sean | martin | 213 | U.S.A | New York City | 123 |
|  |  |  | U.S.A | New York City | 23 |
|  |  |  | U.S.A | New York City | 67 |

Fig. 19

| count_FirstName | FirstName | sum_sum_PurchaseAmount | LastName | sum_PurchaseAmount | sum_PurchaseAmount_1 | City | Country | PurchaseAmount |
|---|---|---|---|---|---|---|---|---|
| 6 | Alexander | 212 | Carn | 212 | 45 | Sydney | Australia | 45 |
| | | | | | 167 | Sydney | Australia | 167 |
| | Christopher | 67 | Brown | 67 | 67 | Seattle | U.S.A | 67 |
| | Colin | 365 | Howell | 365 | 132 | London | England | 132 |
| | | | | | 233 | London | England | 233 |
| | John | 1171 | Smith | 1139 | 171 | Sydney | Australia | 171 |
| | | | | | 255 | Sydney | Australia | 255 |
| | | | | | 713 | Sydney | Australia | 713 |
| | | | Martin | 32 | 32 | Melbourne | Australia | 32 |
| | Peter | 1146 | Fraser | 1146 | 568 | Beijing | China | 568 |
| | | | | | 578 | Beijing | China | 578 |
| | Sean | 190 | martin | 190 | 67 | New York City | U.S.A | 67 |
| | | | | | 123 | New York City | U.S.A | 123 |

Fig. 21

| count_FirstName | sum_sum_PurchaseAmount | FirstName | LastName | sum_PurchaseAmount | sum_PurchaseAmount_1 | City | Country | PurchaseAmount |
|---|---|---|---|---|---|---|---|---|
| 6 | 3151 | Alexander | Carn | 212 | 45 | Sydney | Australia | 45 |
| | | | | | 167 | Sydney | Australia | 167 |
| | | Christopher | Brown | 67 | 67 | Seattle | U.S.A | 67 |
| | | Colin | Howell | 365 | 132 | London | England | 132 |
| | | | | | 233 | London | England | 233 |
| | | John | Smith | 1139 | 171 | Sydney | Australia | 171 |
| | | | | | 255 | Sydney | Australia | 255 |
| | | | | | 713 | Sydney | Australia | 713 |
| | | | Martin | 32 | 32 | Melbourne | Australia | 32 |
| | | Peter | Fraser | 1146 | 568 | Beijing | China | 568 |
| | | | | | 578 | Beijing | China | 578 |
| | | Sean | martin | 190 | 67 | New York City | U.S.A | 67 |
| | | | | | 123 | New York City | U.S.A | 123 |

Fig. 22

| City | count_FirstName | sum_sum_PurchaseAmount | FirstName | LastName | sum_PurchaseAmount | sum_PurchaseAmount_1 | Country | PurchaseAmount |
|---|---|---|---|---|---|---|---|---|
| Beijing | 1 | 1146 | Peter | Fraser | 1146 | 568 | China | 568 |
|  |  |  |  |  |  | 578 | China | 578 |
| London | 1 | 365 | Colin | Howell | 365 | 132 | England | 132 |
|  |  |  |  |  |  | 233 | England | 233 |
| Melbourne | 1 | 32 | John | Martin | 32 | 32 | Australia | 32 |
| New York City | 1 | 190 | Sean | martin | 190 | 67 | U.S.A | 67 |
|  |  |  |  |  |  | 123 | U.S.A | 123 |
| Seattle | 1 | 67 | Christopher | Brown | 67 | 67 | U.S.A | 67 |
| Sydney | 2 | 1351 | Alexander | Carr | 212 | 45 | Australia | 45 |
|  |  |  |  |  |  | 167 | Australia | 167 |
|  |  |  | John | Smith | 1139 | 171 | Australia | 171 |
|  |  |  |  |  |  | 255 | Australia | 255 |
|  |  |  |  |  |  | 713 | Australia | 713 |

| Country | City | FirstName | LastName | PurchaseAmount |
|---|---|---|---|---|
| Australia | Sydney | John | Smith | 255 |
| Australia | Sydney | John | Smith | 171 |
| England | London | Colin | Howell | 233 |
| Australia | Sydney | John | Smith | 713 |
| England | London | Colin | Howell | 132 |
| China | Beijing | Peter | Fraser | 578 |
| China | Beijing | Peter | Fraser | 568 |
| Australia | Melbourne | John | Martin | 32 |
| U.S.A | New York City | Sean | martin | 123 |
| U.S.A | New York City | Sean | Martin | 23 |
| U.S.A | New York City | Sean | martin | 67 |
| U.S.A | Seattle | Alexander | Brown | 23 |
| U.S.A | Seattle | Christopher | Brown | 67 |
| Australia | Sydney | Alexander | Carn | 45 |
| Australia | Sydney | Alexander | Carn | 167 |

Fig. 29

METHOD OF APPLYING A FUNCTION TO A DATA SET

CROSS-REFERENCE TO RELATED PATENT APPLICATIONS

This application claims the right of priority under 35 U.S.C. §119 based on Australian Patent Application No. 2005220268, filed Oct. 10, 2005, which is incorporated by reference herein in its entirety as if fully set forth herein.

FIELD OF THE INVENTION

The current invention relates to databases and, in particular, to processing including the browsing, manipulation, viewing and analysis of in-memory data sets originating from databases.

BACKGROUND

There is a need to store information in a form which is both accessible and retrievable. Examples of such information include employment records, monetary transactions, telephone numbers and medical records. Prior to the development of computers, paper based solutions were used for the recording, storage and retrieval of such information. Such solutions however required a large amount of storage space, a careful filing system to ensure each unit of information could be found, and a significant amount of time and human effort to search and retrieve the information. With the development of computing, database systems were devised to facilitate the storage and retrieval of such information. Popular amongst these are relational database management systems, which store related data in structures that can be visualised as tables. Such a database generally supports a structured query language, which software using the database may use to request the retrieval of information.

Having information available in databases that can be easily and instantly accessed has given rise to a greater amount of analysis being performed on the stored data.

An important aspect of data analysis is that of exploration. Databases are often very large and often analysis is performed in an exploratory fashion, meaning that users don't always know what answers they want, or how to get them. This demonstrates the need for a method of analysis which allows for exploration of the data and evaluation of the analysis results. One such method is incremental, where users obtain feedback after every operation. That feedback can then be evaluated. Users can decide to proceed with the analysis (and apply further operations), or to take the analysis in a completely different direction.

Such analysis is widely used. Currently, pivot tables and cross-tab reports are the most common way to generate tabular reports summarising large amounts of data incrementally. Approaches generally follow the steps below:

Interrogating a dataset to establish a list of data fields.
Building a new report by specifying which fields users wish to appear as row labels, and which fields they wish to appear as column labels. Multiple fields can be used for each type of label, creating a hierarchy of row and column labels.
Additionally, users add data field(s) to the report to establish the data that they wish to display. The value to be displayed in each cell of the report table is calculated by applying an implicit function to summarise the data field(s).

The cells that are summarised to produce a value in the output report cell are those which correspond to the output report cell's particular combination of row and column labels. Further data fields can be added to the report, resulting in multiple rows per output report cell, one per added field.

Users can adjust their tabular report by changing the set of fields currently involved in the generation of the report. Re-ordering the row and column labels changes the report.

Users can add/remove/re-order data fields and change the aggregate function used to calculate the output value.

Whilst the above approach does provide feedback and allows users to summarise groups of data, users often need some sort of indication about the data contained in the fields. This helps them decide how to analyse that data in a more effective way. For the same reason, output reports generated by prior art approaches fail to provide a good contextual grasp of the data to people who are not already familiar with that data and its semantic meaning.

SUMMARY OF THE INVENTION

In accordance with one aspect of the present invention there is disclosed a method of applying a function to a set of data, said method comprising the steps of:

(i) providing a tabular representation of the set of data, said representation comprising a plurality of columns;

(ii) grouping the data in the representation in each said column based upon an order of at least one said column in the tabular representation; and (iii) generating a new column of data comprising a transform of existing column data contained in the tabular representation, wherein transform data within said new column depends upon a grouping context of said existing column data.

In accordance with another aspect of the present invention there is disclosed a method of displaying a set of data, said method comprising the steps of:

(a) displaying a tabular representation of the set of data, said representation comprising a plurality of columns;

(b) detecting a selection of at least one said column displayed in said tabular representation;

(c) detecting a repositioning of said selected at least one column within said tabular representation; and (d) re-determining data values displayed in said repositioned at least one column based upon an order of at least one said column in the tabular representation and a grouping of data of said at least one column.

Other aspects of the invention are also disclosed.

BRIEF DESCRIPTION OF THE DRAWINGS

At least one embodiment of the present invention will now be described with reference to the drawings in which:

FIG. 6 shows a visual result table displayed by the system after the display of FIG. 4 has been modified by the movement of two selected columns left of the grouping widget by the user;

FIG. 17 shows a visual result table displayed by the system after the display of FIG. 29 has been modified by the movement of two selected columns left of the grouping widget by the user;

FIG. 18 shows a visual result table displayed by the system after one of the grouping columns in FIG. 17 has been hidden by the user;

FIG. 19 shows a visual result table displayed by the system after an aggregate function has been applied by the user on the "PurchaseAmount" column of FIG. 18;

FIG. 21 shows a visual result table displayed by the system after more filters, sorts and aggregate functions have been applied by the user to the visual result table of FIG. 19;

FIG. 22 shows a visual result table displayed by the system after an aggregate function is moved within the visual result table of FIG. 21 by the user, thus changing its grouping context;

FIG. 23 shows visual result table displayed by the system after the defined grouping of FIG. 22 is changed by the user through the action of moving another column left of the grouping widget;

FIG. 29 shows a visual result table displayed by the system after the visual result table of FIG. 6 has had its grouping removed by the user moving the grouping widget 615 to the left-hand-side of all columns;

DETAILED DESCRIPTION INCLUDING BEST MODE

Figure 1:
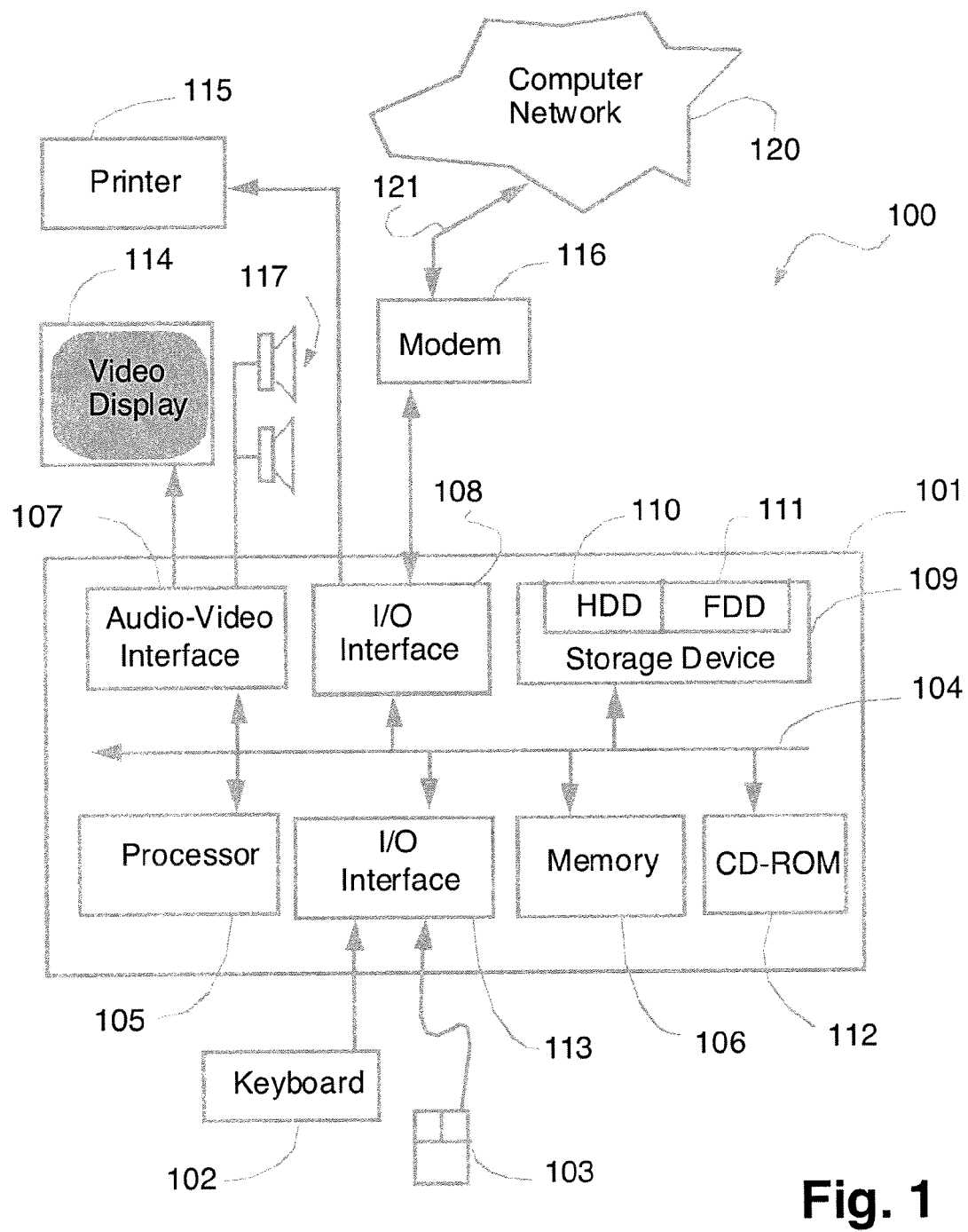
FIG. 1 is a schematic block diagram of a general purpose computer upon which arrangements described can be practiced.

The methods of database processing, representation and manipulation to be described are preferably practiced using a general-purpose computer system 100, such as that shown in FIG. 1 wherein the processes of FIGS. 2 to 31 may be implemented as software, such as an application program executing within the computer system 100. In particular, the steps of the methods of applying a function to a set of data within a database are effected by instructions in the software that are carried out by the computer. The instructions may be formed as one or more code modules, each for performing one or more particular tasks. The software may also be divided into two separate parts, in which a first part performs the database analysis and retrieval methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for applying a function to a data set.

The computer system 100 is formed by a computer module 101, input devices such as a keyboard 102 and mouse 103, output devices including a printer 115, a display device 114 and loudspeakers 117. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN), and may be incorporated into the computer module 101 in some implementations.

The computer module 101 typically includes at least one processor unit 105, and a memory unit 106, for example formed from semiconductor random access memory (RAM) and read only memory (ROM). The module 101 also includes a number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the modem 116 and printer 115. In some implementations, the modem 116 may be incorporated within the computer module 101, for example within the interface 108. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the described arrangements can be practised include IBM-PC's and compatibles, Sun Sparcstations or alike computer systems evolved therefrom.

Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media. The term "computer readable medium" as used herein refers to any storage medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media by which the application program may be delivered include radio or infra-red transmission channels as well as a network connection to another computer or networked device, and the Internet or Intranets including e-mail transmissions and information recorded on Websites and the like. The mouse 103 may be used to provide user control of a cursor displayable within a graphical user interface of the application program upon the display. With the mouse 103, possibly in concert with the keyboard 102, the user may manipulate operation or execution of the application program to achieve a desired effect within the scope of operation of the application program and any operating system under which the computer system 100 is configured to function.

Figure 2:
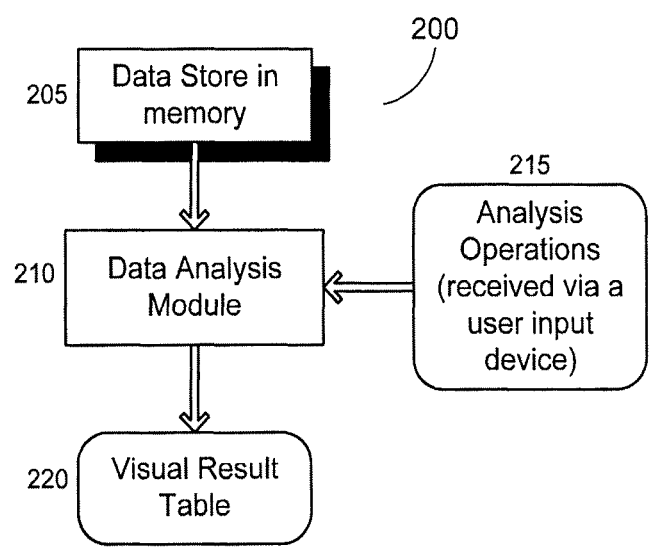
FIG. 2 shows a high-level flow of control between functional components of a database analysis and retrieval system.

FIG. 2 shows the high-level overview of a database processing and retrieval system 200. The system 200 is configured to operate on an in-memory input data store 205, which can be represented as a single table of data and which is typically formed in the HDD 110 of the computer 100, but which during operation may be copied in whole or in part to the semiconductor memory 106. The ability to represent the stored data as a single table does not necessarily preclude the data being non-tabular or in a proprietary format. It simply means that some other method may have to be performed in order to convert the data to tabular data before the described processing can be employed. The data which originated from the data store may derive from a relational database, an XML or spreadsheet file, a word processing document (or even a plurality of any of these). A data analysis module 210 processes the data and outputs a visual result table 220 to the user by rendering the table 220 to a drawing surface, such as the video display 114. Once the visual result table 220 has been presented to the user, the user then decides what sort of analysis they would like to perform and issues an analysis operation 215 via an input device, which is typically a combination of the keyboard 102 and the mouse 103. The analysis operation 215, is received by the computer 100 and is sent back to the data analysis module 210 for execution. After this command has been processed by the data analysis module 210, a new visual result table 220 is displayed to the user via the display 114. Subsequent analysis commands are processed in the same manner, resulting in manually directed iterative analysis.

The following is a list of common analysis operations that users may wish to apply. This is not a definitive list. Instead, it is intended as a description of the terminology used.

Users may wish to apply filters to the visual result table 220, which in turn filter out rows in a visual result table 220 which do not satisfy a set of constraints such as "B EQUALS 3", where "B" is the name of a column within the visual result table 220.

Users may also wish to sort the visual result table 220 by one or more columns. This sorting may be in either an ascending or descending direction. When sorting is performed on more than one column, the sorts form a hierarchy.

Users may wish to group data within the visual result table 220. Columns that data is grouped upon are called grouping columns. If a user is grouping by a single column, the distinct values contained in that column are ascertained. Then rows containing the same distinct value in that column are grouped together in the resultant visual result table 220. If more than one column is grouped upon, the grouping forms a hierarchy. First one grouping column is grouped upon. Then, the rows in each resultant group are grouped by the second grouping column, and so on.

Users may wish to aggregate or summarise data. It is often useful to get a summary calculation for a large number of rows. For example, a "sum" function may be applied to a numeric column in the visual result table 220 to generate a single value representing the sum of every numeric value in that column. This single value is called an aggregate value. This is often used in conjunction with the concept of grouping, so that an aggregate value is generated for each group. The column that the aggregate function is applied to is called the measure column, whilst the result column is called an aggregate column. The types of functions that can be used as aggregate functions are functions which map a number of cells to a single value. For example, "average", "sum", "min" and "max" functions. The output may also be the output of a mathematical formula. This mathematical formula may contain any combination of binary and unary mathematical operators, numerical constants and one or more of the aggregate functions listed above. Further the formula may contain accounting or statistical formulae depending on the particular application. For example, statistical calculations may include standard deviation, variance, median, mode, sample-variance and sample-standard deviation functions or operation.

Users may wish to hide unwanted columns.

Figure 28:
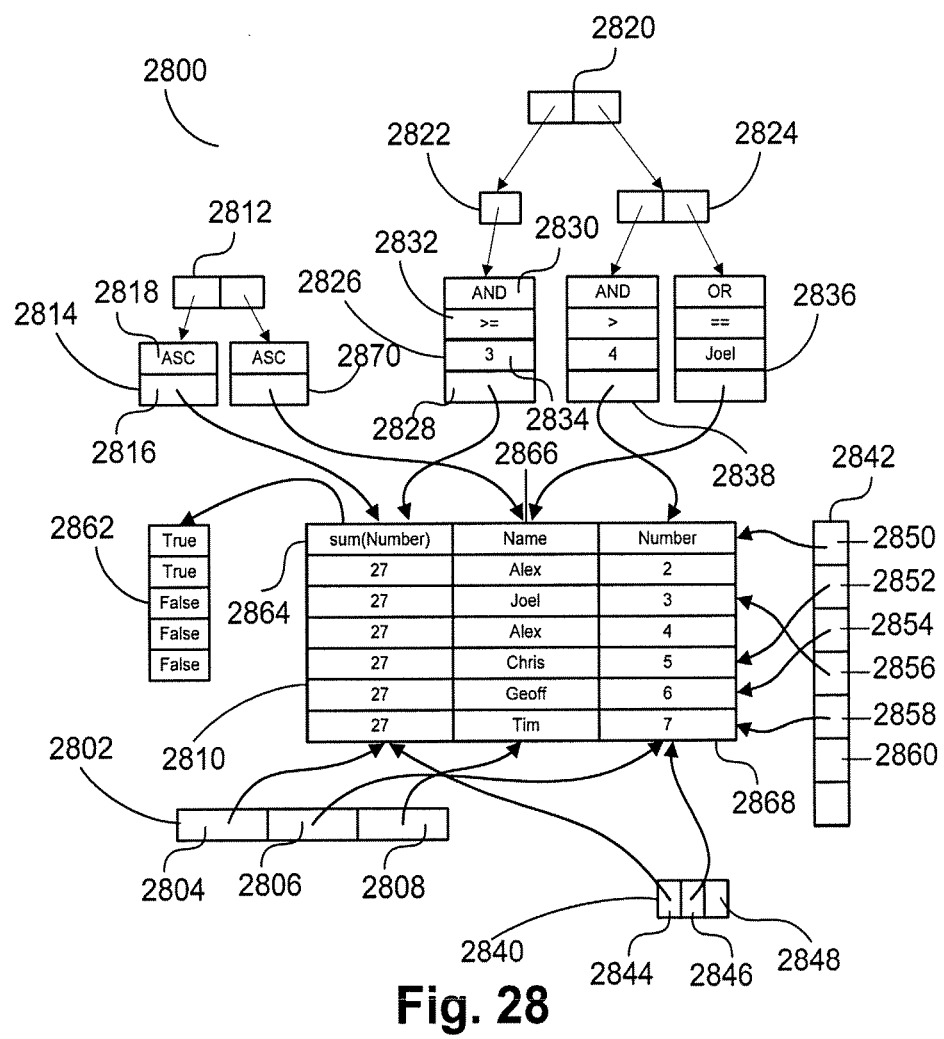
FIG. 28 shows a more detailed view of various components used in the data analysis module, including the physical data table, the column ordering list, the filter list, the sort list, the column mappings, the row mappings and an example grouping row breaks array.

A diagram of the components and data structures 2800 of the data analysis module 210 is shown in FIG. 28. A physical data table 2800 has pointers 2864, 2866 and 2868 that point to the physical columns which make up the physical data table 2810. Initially, the data analysis module 210 copies the data store 205 into the data structure formed by the table 2810. Since both the data store 205 and the physical data table 2810 can be represented as tabular structures, copying the data is done by first ensuring that the physical data table 2810 is the same size as the data store 205, and then copying the data cell-by-cell between the tabular representations. The data in the physical data table 2810 persists during operation of the data analysis module 210. A column ordering list 2802 is provided and defines the order in which columns in the physical data table 2810 would appear in the visual result table 220 if no columns were hidden. Each element 2804, 2806, 2808 in the column ordering list 2802 points to a column in the physical data table 2810. A sort list 2812 is provided and represents a list of sort operations which have been applied by the user to the physical data table 2810, of which operations 2814 and 2870 are examples. Each sort has a direction, exemplified by 2818, and a pointer to the column of data to be sorted, exemplified by 2816. In this example, sort 2814 represents a primary ascending sort on column "sum(Number)" 2864, whilst sort 2870 represents a secondary ascending sort on column "Name" 2866. A filter list 2820 is also provided, being a list of filter operations, of which 2822 and 2824 are examples, which have been applied by the user to the physical data table 2810. Individual filters, like 2822 and 2824, are combined with a logical "AND" operation. A filter itself may also be a compound Boolean expression and therefore a list of filter elements, of which filter elements 2826, 2836 and 2838 are examples. Filter elements represent a single logical condition and are connected together with a logical filter connector, as exemplified by 2830. This may be a logical "OR" or a logical "AND". In one preferred implementation, the logical filter connector for the first filter element is always 'AND'. Filter elements also contain a filter predicate, as exemplified by 2832, which may be any binary mathematical predicate. Filter elements also contain a filter value, exemplified by 2834, and a pointer to the data column to be filtered, exemplified by 2828. The filter 2822 can therefore be represented by the textual expression "sum(Number)>=3", whilst filter 2824 can be represented by the textual expression "Number>4 OR Name equals 'Joel'". Also visible in FIG. 28 is a column mappings array 2840, along with its associated pointers 2844, 2846 and 2848. These will be described later. A row mappings array 2842 and its associated pointers 2850, 2852, 2854, 2856, 2858 and 2860 will also be described later, as well as a grouping row breaks array 2862 for the physical column 2864.

Figure 4:
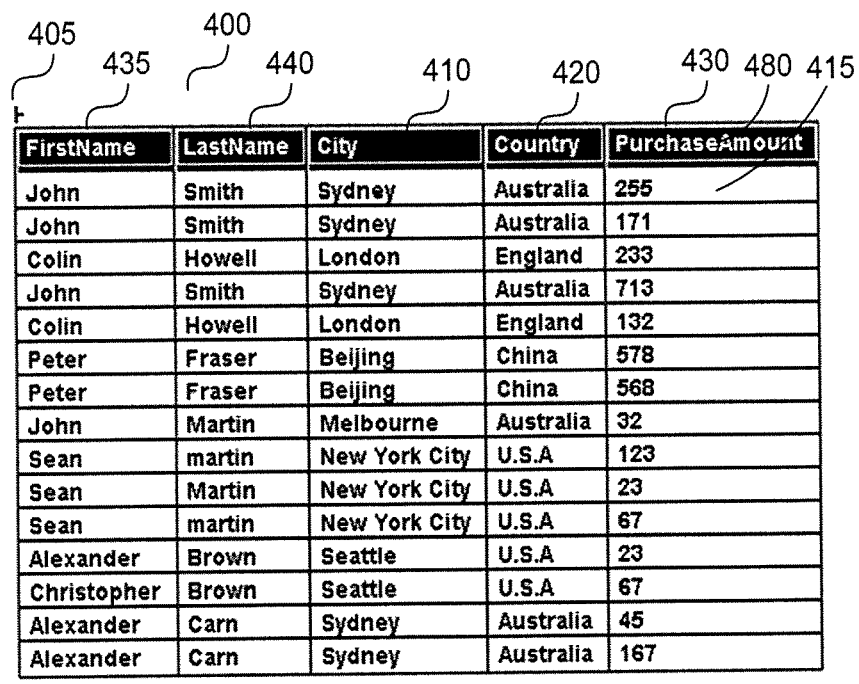
FIG. 4 shows an initial visual result table displayed by the system of FIG. 2 for a set of sample data.

The first task a user wants to do is open a data store 205 for analysis. FIG. 4 shows an exemplary visual result table 400 generated by the system 200 after such a data store 205 has been loaded. The table 400 represents one (initial) view of the set of data. In this regard, the data seen in FIG. 4 may be considered, for the purposes of the present example, as the entirety of data retained in the data store based upon the present loading of that data. Other data may be stored, but is irrelevant for the present purposes. In the arrangements to be described with reference to the remaining drawings, that set of data persists within the memory of the computer 100 during execution of the data analysis module 210, irrespective of what other (eg. aggregate data, to be described) may be determined during the application of various functions and transforms to the set of data, which may vary the view presented to the user via the display 114.

A graphical widget 405 is provided in the visual result table 400 and is called a grouping widget. Columns on the left-hand side of the grouping widget 405 form the set of columns by which the data will be grouped. In FIG. 4, there is no initial grouping. The cells, of which cell 480 is an example, are called column headers, whilst cell 415 exemplifies a data cell.

Once the initial view of FIG. 4 has been loaded, the user might wish to begin analysis by grouping similar data. FIG. 6 shows a visual result table 600 arising from the user moving two columns 410 and 420, left of the grouping widget 405. Preferably, this move is achieved using a drag-and-drop mechanism implemented via the mouse 103. First the visual effects of the operation will be examined, and then the method for generating the visual effects will be described. A grouping hierarchy is established by the columns 605 and 610 left of the grouping widget 615. The visual result table 600 is grouped first by column 605 "Country". Then, for each distinct value/group in 605, the table is grouped by column 610 "City". Within the group columns 605 and 610, duplicate values are not shown. The absence of duplicated values is indicated by the space pointed to by item 625. Normally, cells with the value "Sydney" would be occupying this space. It should be noted that column 605 in FIG. 6 is the same as column 420 in FIG. 4, and column 610 is the same as column 410 in FIG. 4. Throughout this description, a column with the same name as another column in another figure is considered the same column as that other column. The grouping of the data shown in the columns 615 and 610 of FIG. 6 are respectively examples of a transformations of data contained in the columns 410 and 420 of FIG. 4

Figure 3:
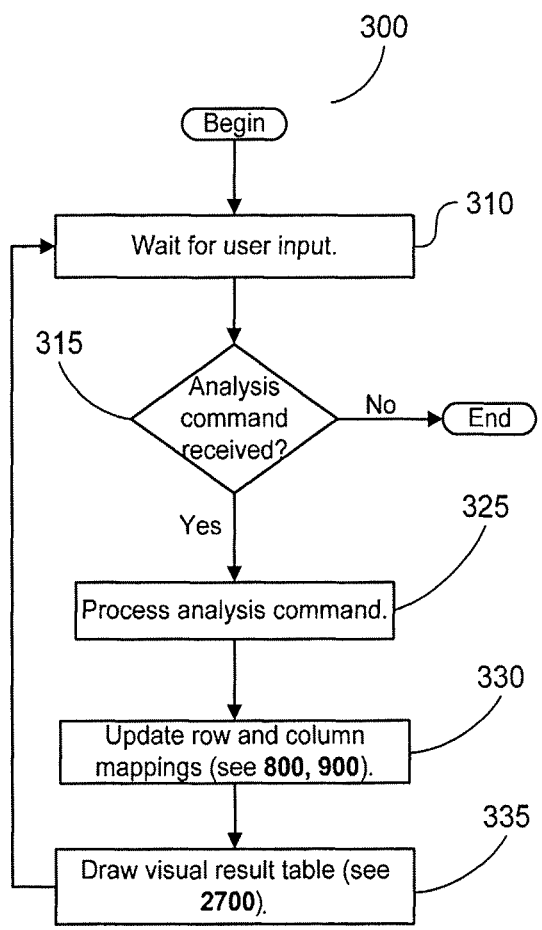
FIG. 3 is a high-level flowchart of the operation of the data analysis module (210) of FIG. 2.

FIG. 3 shows in a method 300 of how the data analysis module 210 generates visual result table 600 from the original visual result table 400. In step 310, the data analysis module 210 waits for input. Based on this user input, step 315 determines that the user has requested a move of columns 410 and 420. Therefore, the test at step 315 returns true and flow continues through to step 325, where the move operation is processed. Step 330 then updates the row and column mappings. The concept of mappings and the operation of step 330 will be described later. Finally, step 335, which will also be described later, draws the visual result table, producing visual result table 600 as output.

Figure 7:
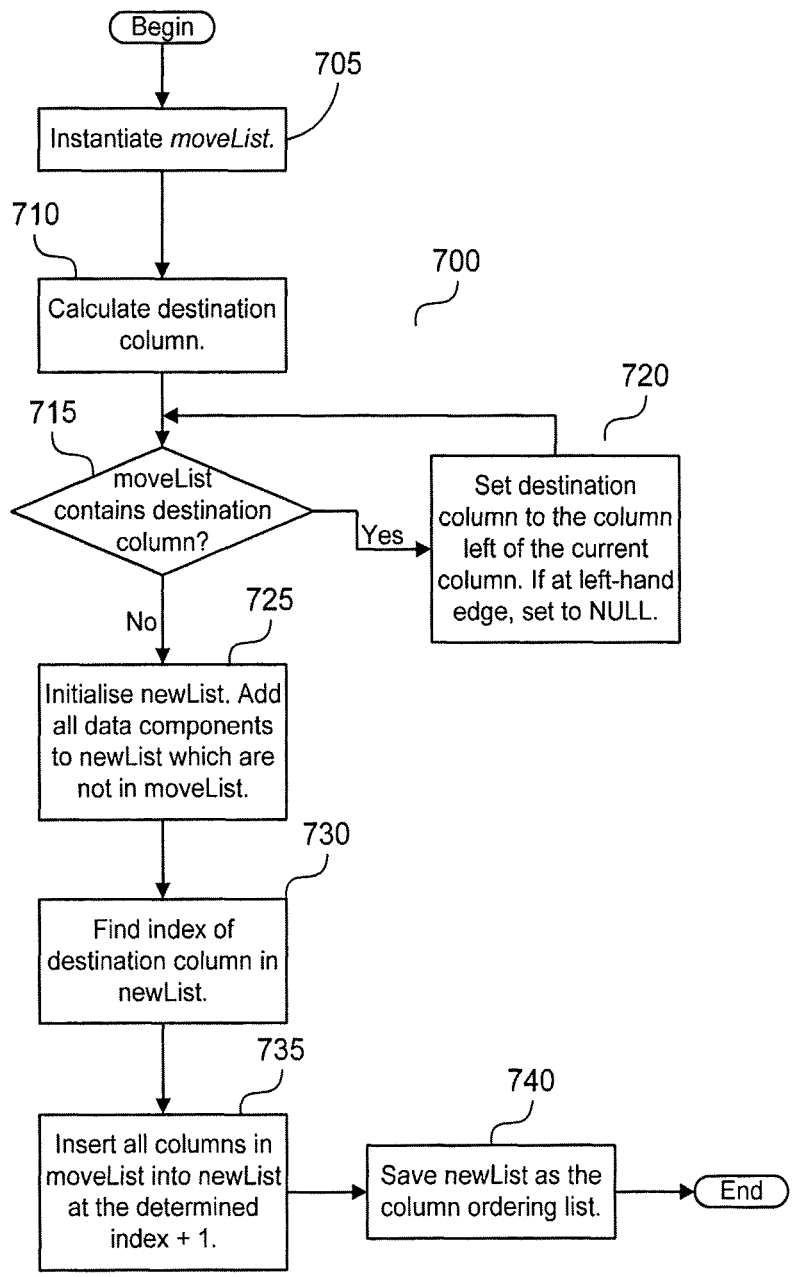
FIG. 7 is a flowchart of a method employed by the data analysis module when columns are moved.

For the case where the user has requested a move of columns 410 and 420, step 325 invokes a method 700 illustrated in FIG. 7 to process the move. In step 705, a list variable moveList is instantiated. The columns to be moved, 410 and 420, are added to this list. Step 710 calculates the initial value of the destination column in the visual result table 400 after which columns 410 and 420 should be placed. In the preferred implementation, this is performed by examining the drop point of the aforementioned drag-and-drop operation. In the example given, columns 410 and 420 are to become the first two columns of visual result table 600, 605 and 610. Therefore, the destination column is initially NULL. Step 715 then tests whether moveList contains the destination column. If the test return true, flow continues through to step 720. Step 720 assigns the destination column variable to the column left of the current destination column in the visual result table 400.

Several iterations through steps 715 and 720 may occur until a suitable column to the left is found, or the left-most column has been reached, in which case step 720 sets the destination column to NULL. The test at step 715 then fails, and flow continues through to step 725. In the example whose result is shown in visual result table 600, the destination column is NULL, so flow passes through to step 725 immediately. In Step 725, a list variable newList is initialised and the columns not being moved 435, 440 and 430 are added to newList in the same left-to-right order that they appear in the visual result table 400. These columns will appear as columns 620, 630 and 640 in FIG. 6. Step 730 then searches for the destination column in newList, returning the index at which the destination column appears in the list. The destination column is NULL in the example, so the search returns an index of negative one. Step 735 then proceeds to insert the columns contained in moveList into newList at the determined index plus one. In this case, this means that the columns in moveList are inserted into newList at index zero. After the insertion is performed, step 740 saves newList as the new column ordering list, exemplified by 2802.

Returning to FIG. 3, after step 325 has finished processing an analysis command, step 330 updates the column and row mappings to take into account changes made. The concept of column and row mappings will now be explained. The data contained in the visual result table 400 is a replica of the data in the physical data table, exemplified by 2810. As analysis operations are applied, the visible data represented on the video display screen 114 changes. Incrementally changing the physical data table is a computationally expensive operation. A large part of this cost is the de-allocation and re-allocation of memory. Instead, in the system 200 the data cells in a visual result table are mapped to data cells in the physical data table. Rows, columns and cells in the physical data table are called physical rows, columns and cells. Rows, columns and cells in a visual result table are called logical rows, columns and cells. Item 2840 in FIG. 28 represents the column mappings for the physical data table 2810 comprising physical columns 2864, 2866 and 2868. Item 2842 represents the row mappings for the same physical data table. Both the column mappings array 2840 and the row mappings 2842 are arrays of pointers. The size of these arrays is equal to the number of physical rows or physical columns in the physical data table 2810. A pointer 2850 points to the physical row to be used as the first logical row in the visual result table. Because column headers are always shown, there should always be a mapping between the first logical row and the first physical row. Likewise, pointers 2852, 2854, 2856 and 2858 point to physical rows which will appear as the second, third, fourth and fifth logical rows in the visual result table. In the example given, there are only five logical rows shown despite seven rows being present in the physical table 2810. This is due to the fact that rows have been filtered out by filters 2822 and 2824. Therefore, pointers such as 2860 will be NULL. Similarly, pointer 2848 maps to NULL as there are only two logical columns and three physical columns. Such a situation arises when columns have been hidden by the user. Pointer 2844 maps to physical column 2864 and pointer 2846 maps to physical column 2868, meaning that physical column 2866 is the hidden column.

Figure 8:
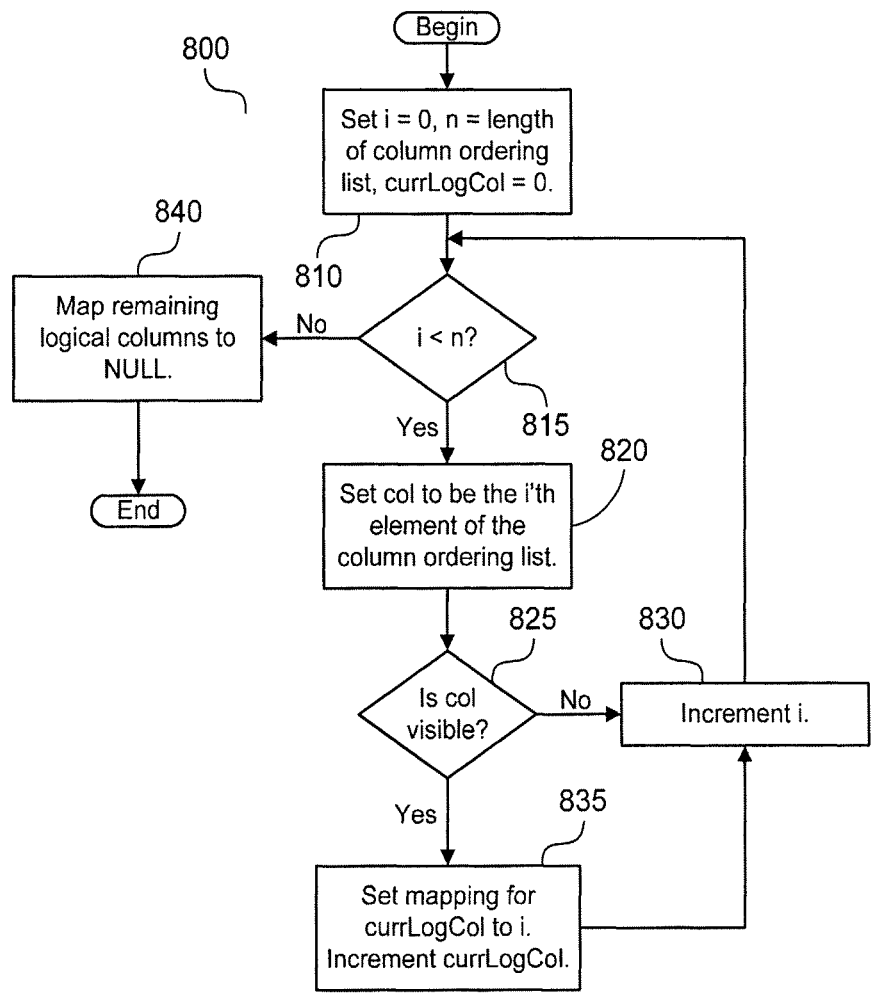
FIG. 8 is a flowchart of a method employed by the data analysis module to recalculate the column mappings for visual result table.

Given the above description of how changes in the visual table are made, as seen in FIG. 3, step 330 first updates the column mappings by invoking a method 800 illustrated in FIG. 8. In step 810, some variables are initialised, namely, i, n and currLogCol. The variable i is the index of the physical column currently being processed by the method 800, and is initialised to zero, whilst n is initialised to the total number of physical columns. For the present case, whose visual result is seen in FIG. 6, n is initialised to five. The variable currLogCol is a counter indicating how many logical columns have been mapped so far, and is initialised to zero. Step 815 tests whether all the physical columns have been processed by comparing i to n. The condition at step 815 is satisfied when i is less than n. In the present example, zero is less than five, so the condition is satisfied. In this case, step 820 sets a variable col to be the i'th element of the column ordering list, exemplified by 2802, calculated in step 740. Since i is initially zero, col is initially set to the first element of the current column ordering list. In our example, this is the column "Country" 420. Step 825 tests whether col is currently visible. In the example, the user has not yet elected to hide any columns, and the condition at step 825 is satisfied. Therefore, step 835 creates a mapping by assigning the pointer at index currLogCol in the column mappings array 2840 to point to col. In the present example, this means the first element of the array 2840 will point to the physical column "Country" 420. currLogCol is then incremented. In step 830, i is incremented so that the next physical column will be processed by the next iteration of the loop. Since no columns have been hidden by the user in our example, steps 810 through to 835 will be repeated until all the physical columns have been processed. The condition at step 815 will then be violated. Step 840 then maps all the remaining logical columns to NULL. This is achieved by iterating through the entries in the column mappings array, exemplified by 2840, setting the pointers to NULL, starting from the value of currLogicalCol. In the present example, currLogicalCol equals five after all the physical columns have been processed, since all physical columns have been mapped to a logical column. Since the column mappings array is also of size five in our example, no work is performed in this step. The method 800 will then terminate and control will return back to step 330 in FIG. 3.

Figure 9:
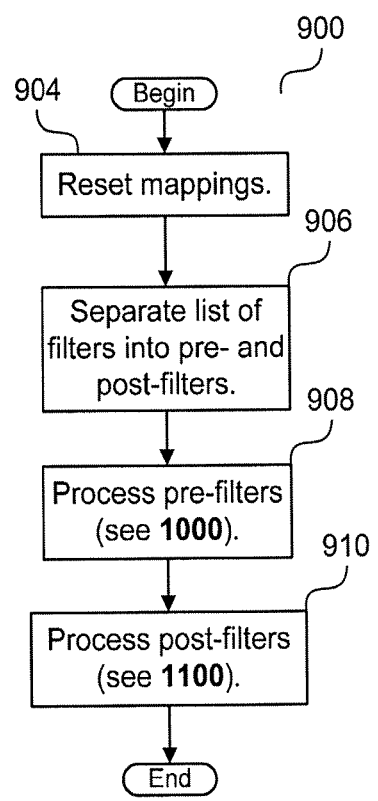
FIG. 9 is a flowchart of a method employed by the data analysis module to recalculate row mappings for the visual result table.
Figure 10:
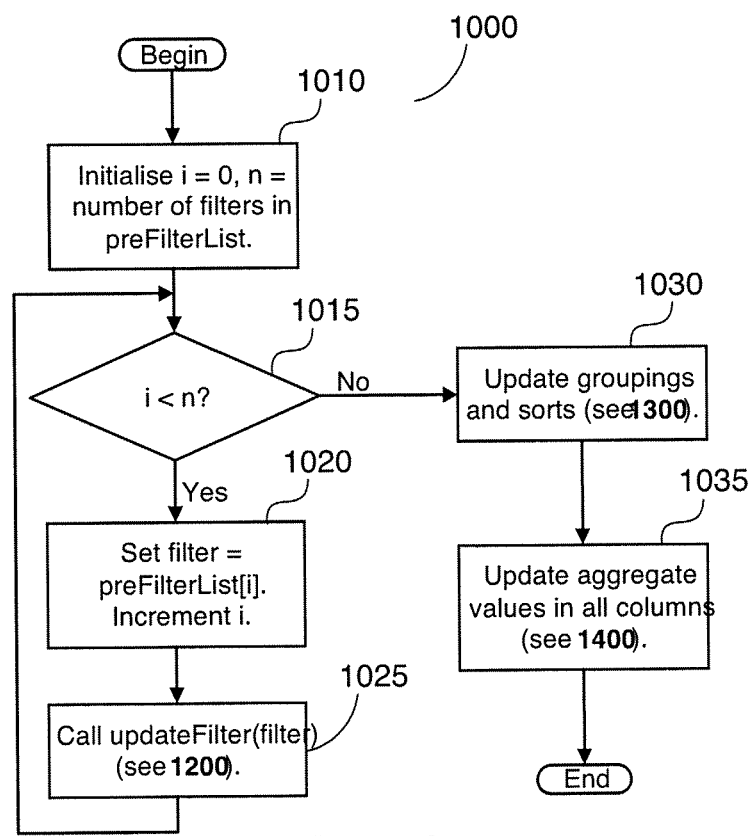
FIG. 10 is a flowchart of a method employed by the method of FIG. 9 to process the pre-filter list.

The second part of step 330 involves updating the row mappings. FIG. 9 shows a flowchart describing a method 900 which updates the row mappings array, exemplified by the array 2842 of FIG. 28. Step 904 resets the row mappings so that all physical rows will be shown in the output table. The row mappings are reset by assigning the pointer at every index i of the array exemplified by 2842 to point to the i'th physical row. Step 906 then divides the filter list, exemplified by 2820, into two lists, one for pre-filters and the other for post-filters. If a filter contains a filter element which filters on an aggregate column, it is classified as a post-filter. Otherwise it is a pre-filter. Since the user has not applied any filters in the present example, both the pre-filter list and the post-filter list will be empty at the end of step 906. Step 908 then processes the pre-filter list. Step 908 is shown in more detail in the method 1000 of FIG. 10.

In step 1010 some variables are initialised, namely i and n. The variable i is the index within the pre-filter list of the pre-filter currently being processed by the method, and is initialised to zero, whilst n is initialised to the total number of pre-filters in the pre-filter list. For the present case whose visual result is seen in FIG. 6, n is zero. Therefore, the condition at step 1015 immediately returns false, and flow continues through to step 1030. Steps 1020 and 1025 will be described in a later example involving pre-filters. Step 1030 updates the row mappings based on the grouping and sorts applied by the user. Since the current example involves moving two columns, 410 and 420, left of the grouping widget 405 it is expected that the row mappings will change as a result of this step. Step 1030 is described in more detail in FIG. 13.

Figure 13:
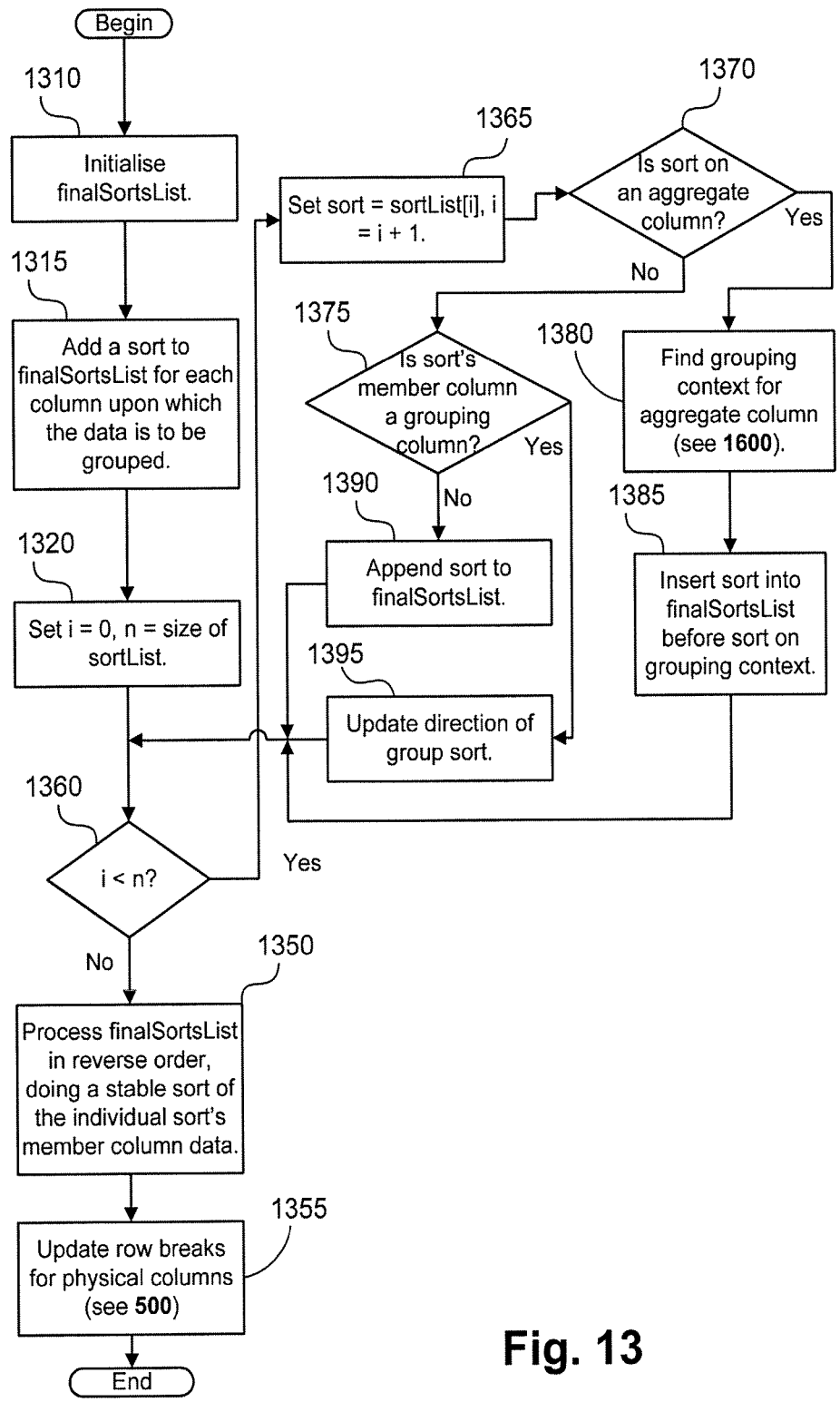
FIG. 13 is a flowchart of a method used to update the row mappings as a result of sort operations and grouping applied to the visual result table by the user.

In FIG. 13 at step 1310, a list variable finalSortsList is initialised. In step 1315, a sort object, exemplified by sort operation 2814, is created for each grouping column and appended to finalSortsList. In the present example, two sort objects are created and appended. The first contains a pointer, exemplified by 2816, to the column "Country" 420, and the second contains a pointer to the column "City" 410. In both cases, the direction of the sort, exemplified by 2818, is marked as "ascending" (ASC). In step 1320 some variables are initialised, namely i and n. The variable i is the index within the sort list, exemplified by 2812, of the sort object currently being processed by the method 1000, and is initialised to zero. The variable n is initialised to the total number of sort objects in the sort list. For the present case whose visual result is the view 600 of FIG. 6, n is zero. Therefore, the condition at step 1360 immediately returns false, and flow continues through to step 1350. Steps 1365 through 1395 will be described in a later example involving user-defined sorts.

In Step 1350,finalSortsList is processed in reverse order, Processing in reverse order is important as the primary sort for the view is the first sort object in finalSortsList. Therefore, it must be the last sort applied. Rows with the same value in the column pointed to by the first sort object in finalSortsList, must be sorted according to that finalSortsList's second sort object. Therefore, a sort which is stable must be employed so that the sorting performed by the first sort object does not override the sorting performed by the second sort object if the rows have the same value in the column pointed to by the first sort object. In a preferred implementation, the sort is also performed in a case-insensitive fashion. For the example whose result is displayed in visual result table 600, finalSortsList has two elements. The second sort object, which contains a pointer to the column "City" 410, is processed first. There are sixteen logical rows after the pre-filters have been applied, since no physical rows were filtered out. This was because there were no pre-filters defined. The first row constitutes the column headers. Therefore, rows 1 through 15 are to be sorted. The stable sort is achieved by sorting the row mappings with a custom comparator which compares the values in the logical data cells contained in the column being sorted upon, exemplified by the column 2864 being pointed to by the pointer 2816.

Table 1 shows the resulting row mappings after the stable sort has been applied. The first column indicates the logical row number and the second the physical row number to which the logical row number has been mapped. The third column shows the actual data, to better illustrate the operation.

TABLE 1

Row mappings after processing first sort

| Logical Row Number | Physical Row Number | Data in "City" column 420 |
|---|---|---|
| 1 | 6 | "Beijing" |
| 2 | 7 | "Beijing" |
| 3 | 3 | "London" |
| 4 | 5 | "London" |
| 5 | 8 | "Melbourne" |
| 6 | 9 | "New York City" |
| 7 | 10 | "New York City" |
| 8 | 11 | "New York City" |
| 9 | 12 | "Seattle" |
| 10 | 13 | "Seattle" |
| 11 | 1 | "Sydney" |
| 12 | 2 | "Sydney" |
| 13 | 4 | "Sydney" |
| 14 | 14 | "Sydney" |
| 15 | 15 | "Sydney" |

The first sort object in finalSortsList, which contains a pointer to the column "country" 420 is then processed. Table 2 shows what the mappings look like after the final sort. Note that the physical row numbers for "Australia" appear in the same order that they did in the Table 1. This is due to the sort operation being stable, and is how hierarchical sorting is achieved in preferred implementations.

TABLE 2

Row mappings after processing second and final sort

| Logical Row Number | Physical Row Number | Data to appear in "Country" column 605 | Data to appear in "City" column 610 |
|---|---|---|---|
| 1 | 8 | "Australia" | "Melbourne" |
| 2 | 1 | "Australia" | "Sydney" |

TABLE 2-continued

Row mappings after processing second and final sort

| Logical Row Number | Physical Row Number | Data to appear in "Country" column 605 | Data to appear in "City" column 610 |
|---|---|---|---|
| 3 | 2 | "Australia" | "Sydney" |
| 4 | 4 | "Australia" | "Sydney" |
| 5 | 14 | "Australia" | "Sydney" |
| 6 | 15 | "Australia" | "Sydney" |
| 7 | 6 | "China" | "Beijing" |
| 8 | 7 | "China" | "Beijing" |
| 9 | 3 | "England" | "London" |
| 10 | 5 | "England" | "London" |
| 11 | 9 | "U.S.A" | "New York City" |
| 12 | 10 | "U.S.A" | "New York City" |
| 13 | 11 | "U.S.A" | "New York City" |
| 14 | 12 | "U.S.A" | "Seattle" |
| 15 | 13 | "U.S.A" | "Seattle" |

After the first sort object in finalSortsList has been processed, step 1350 is complete. Step 1355 then proceeds to calculate the grouping row breaks array, exemplified by the array 2862, for each physical column in the physical data table. The grouping row breaks array is an array of Boolean flags. For non-grouping physical columns, the grouping row breaks array is set to NULL. If non-NULL, the size of the array is equal to the number of logical rows. A Boolean value of true at a given index i indicates that the i'th logical row is the first row of a new group in that column. For example, the "Country" column to appear as column 605 in the visual result table 600, sorted as shown in Table 2, would have array entries set to true at logical rows 1, 7, 9 and 11. The "City" column to appear as column 610, again sorted as shown in Table 2, would have entries set to true at logical rows 1, 2, 7, 9, 11 and 14.

Figure 5:
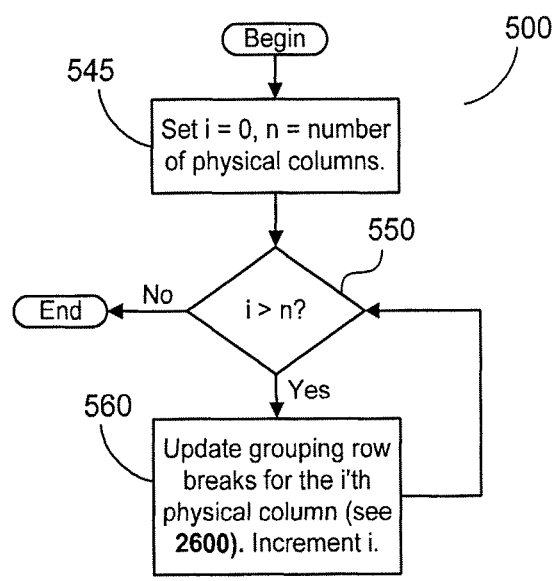
FIG. 5 is a flowchart of a method employed by the data analysis module to update the grouping row breaks array for every physical data column in the physical data table.
Figure 26:
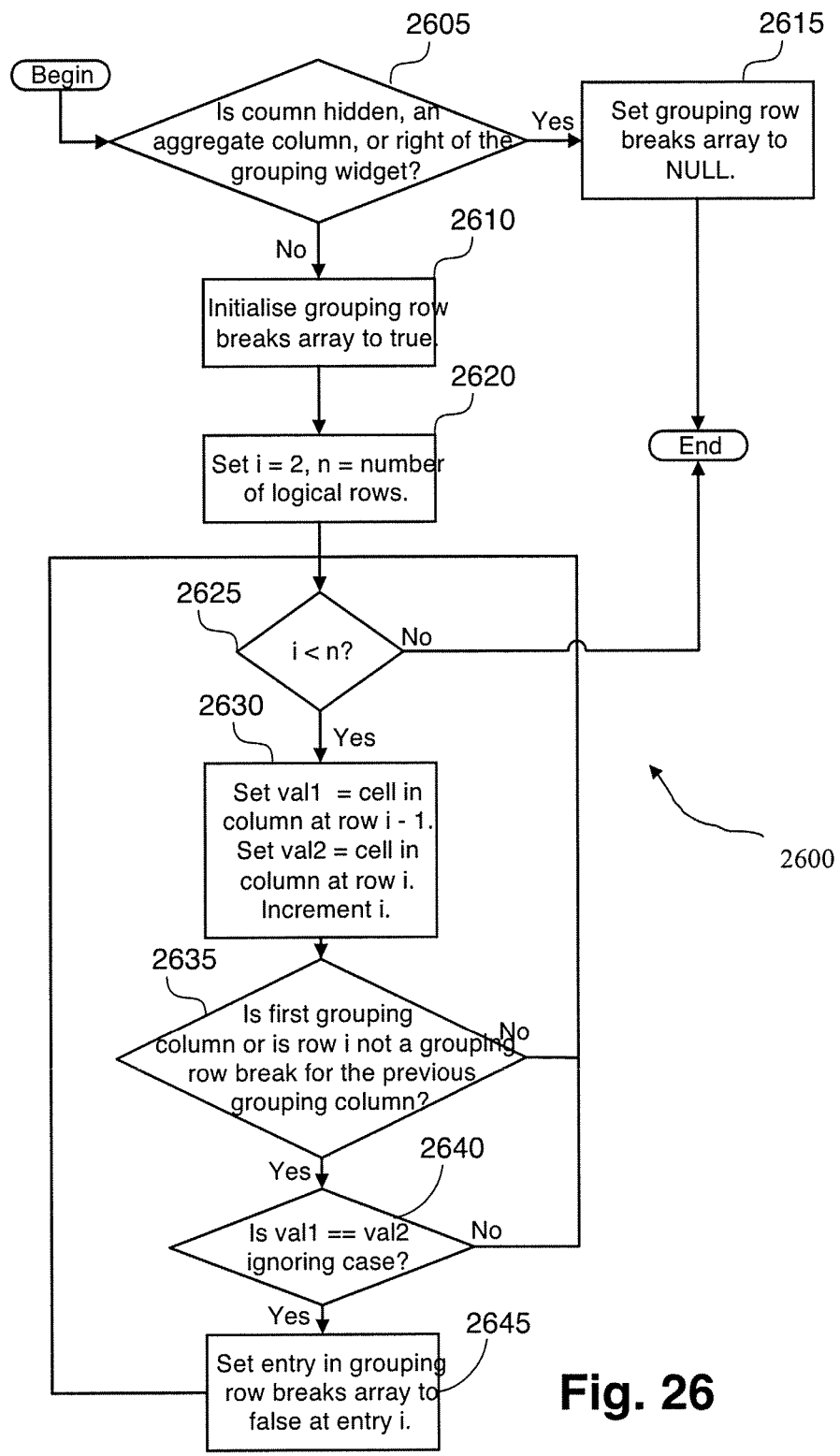
FIG. 26 is a flowchart of a method employed by the data analysis module to set the grouping row breaks array for a given physical column.

A flowchart describing a method 500 employed by step 1355 to calculate the grouping row breaks array, exemplified by 2862, for each physical column, is shown in FIG. 5. In step 545 some variables are initialised, namely i and n. Here, the variable i is the index within the column ordering list, exemplified by 2802, of the physical column currently being processed by the method. The variable i is initialised to zero, whilst n is initialised to the total number of physical data columns. For the present case whose visual result is seen in FIG. 6, n is initialised to five. Since zero is less than five, the condition at step 550 returns true and flow continues through to step 560. Step 560 updates the grouping row breaks array for the first physical column, since i equals zero. The details of step 560 are shown in FIG. 26 and will be described later. The variable i is also incremented by this step so that the next physical column is processed during the next iteration of the loop. Step 550 and 560 are repeated until i equals five and all physical columns have been processed. Then the test at step 550 returns false, the method 500 terminates and flow returns back to step 1355 in FIG. 13.

Figure 31:
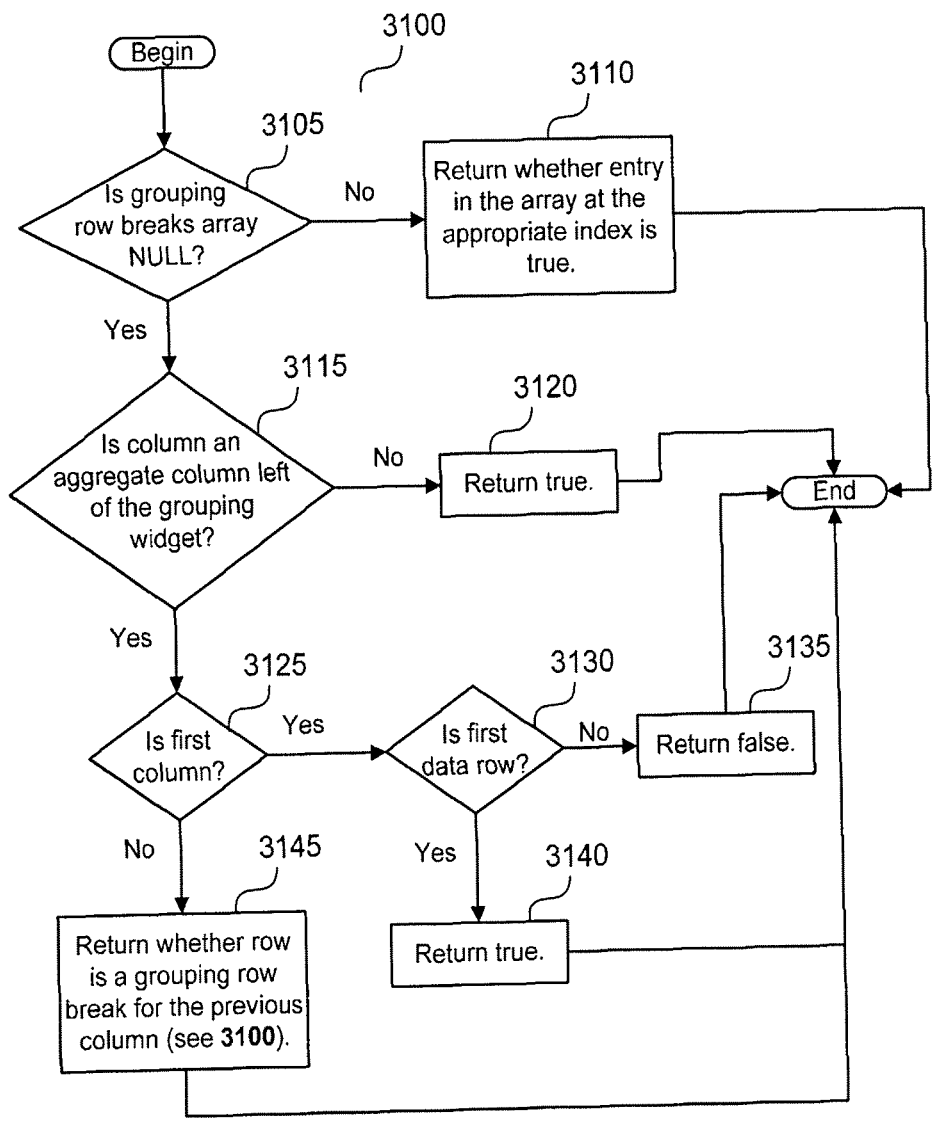
FIG. 31 shows a flowchart of a method employed by the data analysis module to determine whether a physical row number constitutes a grouping row break for a physical column.

FIG. 26 illustrates a method 2600 for determining the grouping row breaks array, exemplified by 2862, for a given physical column. The method 2600 is invoked from step 560, as described previously. For the present case whose result is shown in visual result table 600, the physical column to appear as column 605 is processed the first time the method 2600 is invoked. Step 2605 tests whether the physical column is a grouping column by ensuring that the column is not hidden, is not an aggregate column, and will not be positioned to the right of the grouping widget 615 in the visual result table 600. If each of these conditions do not hold, then the physical column is not a grouping column and the test at step 2605 returns false. In this case, the grouping row breaks array is set to NULL by step 2615. On the other hand, the physical column to appear as 605 is not an aggregate column, is not hidden and appears left of the grouping widget 615 in FIG. 6. Therefore, the test at step 2605 returns false and flow continues through to step 2610. Step 2610 initialises the grouping row breaks array, exemplified by 2862, by creating an array of sixteen Boolean values, one for every logical row in the visual result table 600. These are all initially set to true, so that every row initially begins a new group. Step 2620 then initialises some variables, i and n. Here, the variable i is the logical row currently being processed, and is initialised to two, whilst n is initialised to the total number of logical rows. The variable i is initialised to two since logical row zero returns the column headers for this column and logical row one always forms a new group, since it's the first data row in the visual result table. For the present case, whose result is shown in visual result table 600, n is initialised to sixteen. Since two is less than sixteen, the test at step 2625 returns true and flow continues through to step 2630. Step 2630 initialises two variables val1 and val2. The variable val1 is initialised to the cell at logical row i-1 in the physical column being processed and val2 to the cell at logical row i in the same column. Given that the column to appear as 605 in the visual result table 600 is being processed, val1 and val2 are both initialised to "Australia". This is because i equals two and Table 2 clearly shows that, for logical rows one and two, the data to appear in "Country" column 605 is equal to "Australia". The variable i is then incremented. Since the physical column to appear as column 605 is the first column to be processed, the test at step 2635 returns true and flow continues through to step 2640. When the physical column being processed is not the first grouping column, step 2635 tests whether the logical row i is a grouping row break in the previous grouping column. This test is made because a grouping row break in a previous grouping column will also be a grouping row break in the physical column currently being processed. The algorithm for determining whether a logical row is a grouping row break in an arbitrary physical column is shown in FIG. 31 and will be described later. For the present case whose result is shown in visual result table 600, "Australia" is equal to "Australia" Therefore, the test at step 2640 returns true and flow continues through to step 2645. Note that the comparison made in step 2640 is a case-insensitive string comparison in the preferred implementation. Step 2645 then sets the grouping row breaks array element at index two to false. This false setting means that logical row two in the physical column to appear as 605 will not be visible in the visual result table 600. Steps 2625 through 2645 are repeated until all the logical rows in the physical column have been processed. At this point the test at step 2625 will fail and flow returns back to step 560 in FIG. 5. Once all the physical columns have been processed, the test at step 550 will fail and control will return back to step 1355 in FIG. 13, which in turn will return control back to step 1030 in FIG. 10. Flow then continues to step 1035.

Figure 11:
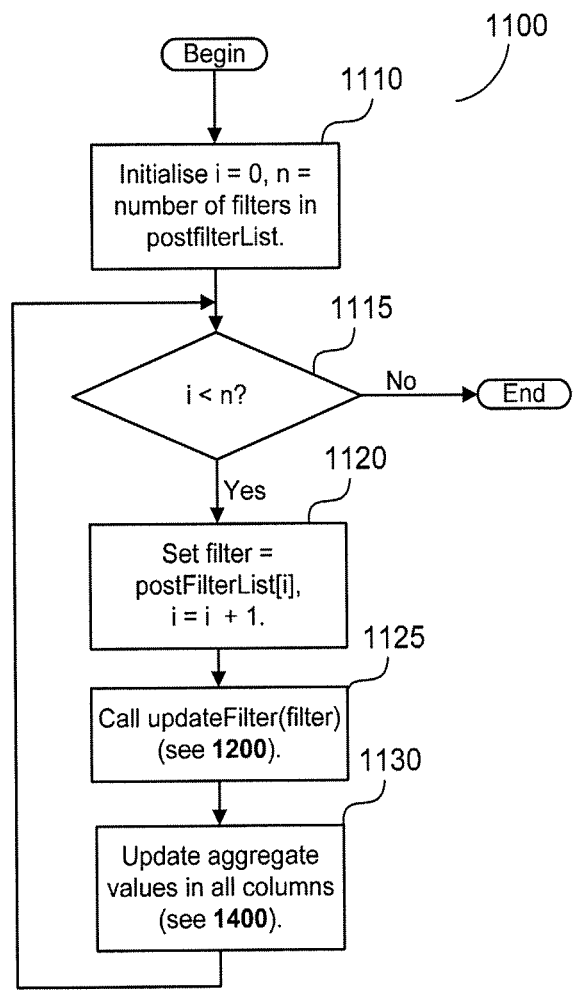
FIG. 11 is a flowchart of a method employed by the method of FIG. 9 to process the post-filter list.
Figure 27:
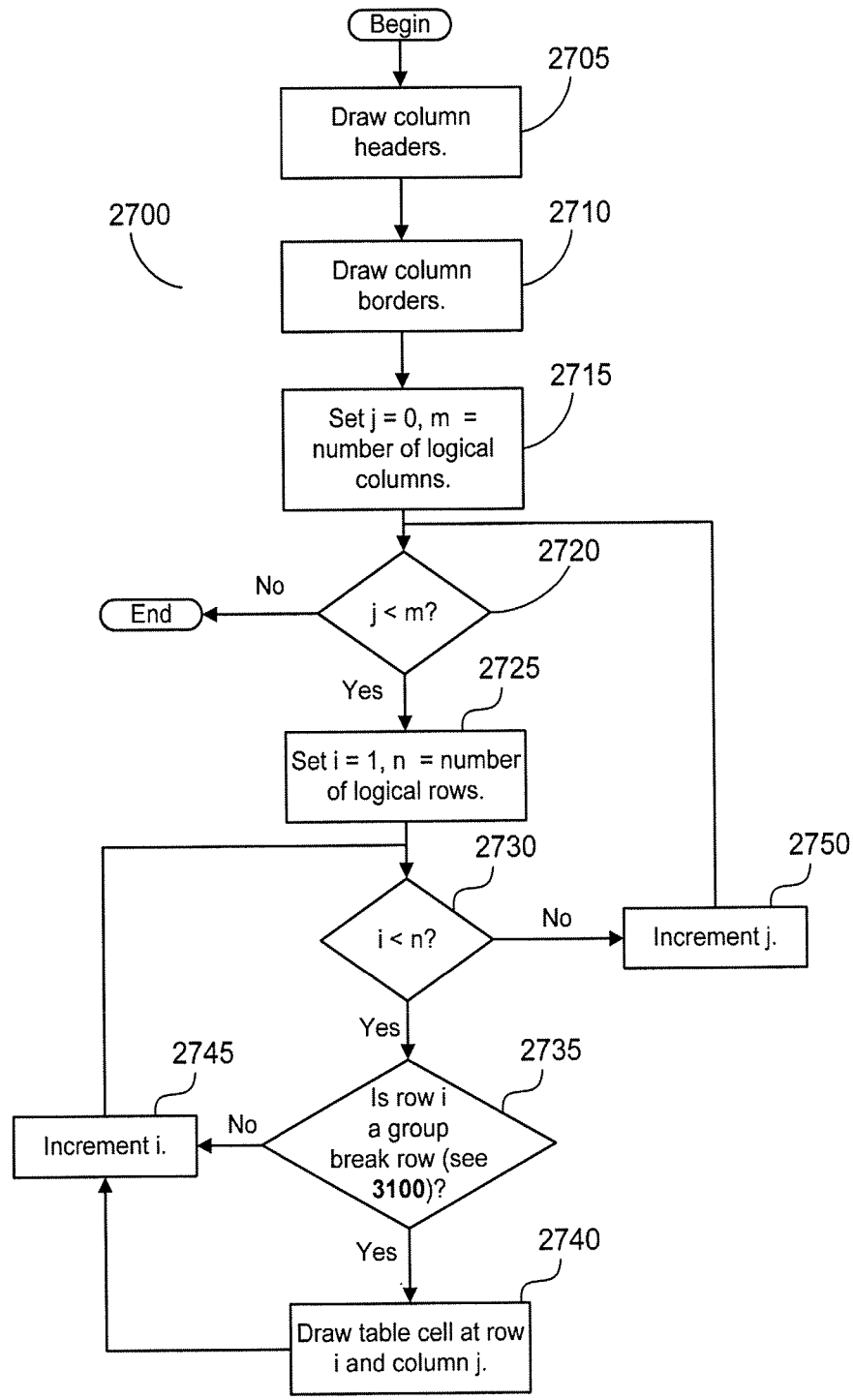
FIG. 27 is a flowchart of a method employed by the data analysis module to draw the visual result table to a display surface.

Given that the user has not defined any aggregate columns, there are no aggregate values to be updated. Therefore, step 1035 doesn't need to do anything. Step 1035 will be described in more detail for examples involving aggregate columns. After step 1035 finishes executing, flow returns back to step 908. Flow then continues to step 910, where post-filters are processed. FIG. 11 describes step 910 in more detail, as a method 1100. In step 1110 some variables are initialised, namely i and n. Here, the variable i is the index within the post-filter list of the post-filter currently being processed by the system 200, and is initialised to zero, whilst n is initialised to the total number of post-filters in the post-filter list. For the present case whose visual result is seen in FIG. 6, n is zero since no filters have been applied. Therefore, the condition at step 1115 returns false immediately, processing terminates and flow returns back to step 910 in FIG. 9. In turn, the processing in FIG. 9 terminates and flow is returns back to step 330 in FIG. 3. At this point the row and column mappings have been completely updated. Flow then continues to step 335, which draws the logical cells to a drawing surface to form the visual result table 600. FIG. 27 describes a method 2700 employed by step 335 to draw the visual result table.

In step 2705, the column headers are drawn to the screen 114. Then, in step 2710, column borders are drawn to the screen 114. In step 2715, some variables, j and m are initialised. The variable j is the logical column currently being processed, and is initialised to zero, whilst m is initialised to the total number of logical columns. For the case whose result is shown in visual result table 600, m is initialised to five. Since zero is less than five, j is less than m and the test at step 2720 returns true. Flow then continues through to step 2725. In step 2725, some variables, i and n are initialised. Here, the variable i is the logical row currently being processed, and is initialised to one, because row zero contains the column headers, which were drawn in step 2705. Variable n is initialised to the total number of logical rows. For the case whose result is shown in visual result table 600, n is initialised to sixteen. Since one is less than sixteen, i is less than n and the test at step 2730 returns true. Flow then continues through to step 2735. Step 2735 then tests whether the logical row i is a grouping row break for the logical column j. Step 2735 will be described in more detail later. If the test at step 2735 returns true, flow continues to step 2740. Step 2740 draws the logical cell to the drawing surface of the display 114 to form part of the visual result table 600 and flow continues through to step 2745. If the test at step 2735 return false, nothing is drawn for the logical cell at logical row i and logical column j and flow continues directly to step 2745. Step 2745 increments i so that the next logical row in logical column j will be drawn during the next iteration of the loop. Steps 2730 to 2745 are repeated until all logical rows in the logical column j have been drawn. Once this occurs, i will equal n. For the visual result table 600, both will equal sixteen. The test at step 2730 then returns false and flow continues through to step 2750. Step 2750 increments j so that the next logical column will be drawn during the next iteration of the loop. Steps 2720 to step 2750 are repeated until all logical columns have been drawn. Once this occurs, j will equal m. For visual result table 600, both will equal five. The test at step 2720 then returns false and the method terminates. At this point, the drawing of the visual result table 600 upon the display is complete.

To determine whether logical row i is a grouping row break for the logical column j, a method 3100 depicted in FIG. 31 is invoked by step 2735. In step 3105, logical column j's grouping row breaks array, exemplified by 2862, is checked to see whether it is NULL. If the array is not NULL, the test at step 3105 returns false and flow continues through to step 3110. From the previous description of the method 2600 illustrated in FIG. 26, the grouping row breaks array will be non-NULL if the logical column is a grouping column. For a grouping column, step 3110 returns the Boolean entry at index i in the grouping row breaks array and processing terminates. In the example whose result is shown in visual result table 600, columns 605 and 610 are grouping columns. If the test at step 3105 returns true, flow continues through to step 3115. If the logical column is not an aggregate column positioned left of the grouping widget 615, the test at step 3115 returns false and flow continues through to step 3120, where the Boolean value 'true' is returned. In the example whose result is shown in visual result table 600, logical columns 620, 630 and 640 trigger this control flow. If the logical column is an aggregate column positioned left of the grouping widget, the test at step 3115 returns true and flow continues through to step 3125. Step 3125 tests whether the logical column is the left-most column to be displayed. If it is not, the test at step 3125 returns false and flow continues through to step 3145. Step 3145 then recursively calls the procedure 3100 on the previous logical column. It then returns the Boolean value returned by that recursive call. If the aggregate column is the first logical column in the view, the test at step 3125 returns true and flow continues through to step 3130. Step 3130 tests whether this logical row is logical row number one. This test is performed because aggregate columns appearing as the first logical column have a single aggregate value appearing at logical row number one. All other logical cells in the first aggregate column should not be drawn. Therefore, if the row is logical row number one, the test at 3130 returns true and flow continues to step 3140, where the Boolean value "true" is returned. Otherwise, the test at 3130 returns false and flow continues to step 3135, where the Boolean value "false" is returned. Flow then returns back to step 2735 in FIG. 27 where processing continues as previously described.

Now that the user has established a grouping hierarchy in FIG. 6 and visual result table 600 has been drawn, the user may decide that the current grouping doesn't offer any insights into the data being viewed. Therefore, the user might decide to remove the grouping. The user may achieve this by moving the grouping widget 615 back to its initial position on the left-hand side of all columns. The result of this operation is shown in visual result table 2900.

To explain how the visual result table 2900 is generated from visual result table 600, the method illustrated in FIG. 3 is analysed. When the user moves the grouping widget 615 back to its initial position left of all the columns in visual result table 600, step 310 receives user input. Step 315 first determines that the user has requested a movement of the grouping widget 615 and step 325 processes the analysis command by setting the new position of the grouping widget, to appear as position 2905, to be to the left of all columns. Step 330 then operates to update the row and column mappings to reflect this change of position of the grouping widget, to appear as 2905.

Step 330 first invokes the method 800 previously-described in FIG. 8 to update the column mappings. Step 330 then invokes the method 900 in FIG. 9 to update the row mappings. Step 904 resets the row mappings as previously described, so that the rows appear in their original order as shown in the visual result table 400. Step 906 then divides the filter list, exemplified by 2820, into two lists, one for pre-filters and the other for post-filters. The user has still not applied any filters in the present example, so the pre-filter list and the post-filter lists will still both be empty at the end of step 906. Step 908 then processes the pre-filter list. Step 908 is shown in more detail in the method 1000 of FIG. 10.

In step 1010 the previously-described variables i and n are initialised. For the case whose visual result is the visual result table 2900 of FIG. 29, n is zero. Therefore, the test at step 1015 immediately returns false, and flow continues through to step 1030. is Since the example whose visual result is shown in FIG. 29 contains no grouping columns and no sorts, step 1030 does nothing. Given that the user has still not defined any aggregate columns, step 1035 also does nothing. Flow then returns back to step 908. Flow then continues through to step 910, where post-filters are processed. As in the previous example, no post-filters have been applied, and the method described in FIG. 9 terminates, returning control back to step 330 in FIG. 3. At this stage, the row and column mappings have finished being updated. The row mappings are equal to the reset mappings established in step 904. Flow then continues to step 335, which draws the logical cells to a drawing surface to form the visual result table 2900. The method employed for drawing the visual result table is the same as that previously described for visual result table 600.

The user may now decide to adjust the grouping in FIG. 29 by moving or repositioning two columns, 2920 and 2925, left of the grouping widget 2905. The result of this operation is shown in the visual result table 1700 of FIG. 17. The generation of visual result table 1700 from visual result table 2900 is analogous to the generation of visual result table 600 from visual result table 400 and the method illustrated in FIG. 3 is again analysed. When the user moves the columns 2920 and 2925 left of the grouping widget 2905, step 310 receives user input. Based on this user input, step 315 determines that the user has requested a move operation. Therefore, the test at step 315 succeeds. Step 325 then processes the move operation, using the previously-described method illustrated in FIG. 7. Step 330 then updates the column mappings to reflect the user's move operation, using the previously-described method illustrated in FIG. 8. Step 330 also updates the row mappings to reflect the move operation, using the previously-described method illustrated in FIG. 9. Step 335 then draws the table to the drawing surface to give the visual result table 1700, using the previously-described method illustrated in FIG. 27.

Users may also wish to hide columns to remove data which is either not relevant to the current analysis being performed, or leading to a cluttered visual result. FIG. 18 shows a visual result table 1800 displayed after the user has hidden the column "FirstName" 1705 in FIG. 17. In a preferred implementation, the user may achieve this by right-clicking the mouse 103 on the column "FirstName" 1705 and selecting an appropriate entry (eg: "Hide") from a context menu that may be displayed over the table 1700 on the display 114. When the user performs this action, step 310 in the method described in FIG. 3 receives user input. Since the user has performed an analysis command, the test at step 315 return true and flow continues through to step 325. Step 325 processes the user's command that the selected column 1705 be hidden. The command is processed by marking the selected column as a hidden column. Step 330 then becomes a matter of updating column and row mappings to reflect this change.

Step 330 first invokes the method previously-described in FIG. 8 to update the column mappings. In step 810, the previously-described variables i, n and currLogCol are initialised to zero, five and zero respectively. The condition at step 815 is initially satisfied, as zero is less than five. In this case, step 820 sets a variable col to be the i'th element of the column ordering list, exemplified by 2802. In the present example, this is the column "FirstName" 1705. Unlike previous examples, col has been marked as a hidden column. Therefore, the test at step 825 returns false and flow continues through to step 830. Because step 835 has been bypassed, no mapping is created between currLogCol and col, meaning that col will not appear in the visual result table 1800. Step 830 increments i and control returns to step 815, where the test still returns true, since one is less than five. Flow then continues through to step 820. Step 820 sets col to be the second element of the column ordering list, exemplified by 2802, which is the "LastName" column 1710 in our example. This column has not been hidden by the user, so the test at step 825 returns true, and flow continues through to step 835. Therefore, step 835 creates a mapping by assigning the pointer at index currLogCol in the column mappings array, exemplified by 2840, to point to col. currLogCol is also incremented by step 835. In step 830, i is incremented. Steps 810 through to 835 are repeated until the rest of the physical columns have been processed and the test at step 815 returns false. Flow then continues through to step 840. Step 840 then maps all the remaining logical columns to NULL. In the example, currLogCol is equal to four at step 840, and n is equal to five. Therefore, step 840 iterates through the entries in the column mappings array, exemplified by 2840, setting the pointers to NULL, starting from the entry at index four. Since n equals five and the column mappings array is therefore also of size five, the entry at index four is the last entry in the column mappings array. Therefore, only the last entry in the column mappings array gets mapped to NULL. This is expected since there is only one hidden column. The method then terminates and flow returns back to step 330 in FIG. 3.

Step 330 then invokes the previously-described method 900 illustrated in FIG. 9 to update the row mappings. Although the input is different than when the method 900 was explained for visual result table 600, the operation of the method 900 is the same. Step 335 then draws the table to the drawing surface to produce the visual result table 1700, using the previously-described method illustrated in FIG. 27. It should be noted that, due to the hiding of the primary grouping column 1705, two entries in the "LastName" column 1710, indicated by items 1740 "Brown" and 1745 "Brown", are grouped together in item 1830 in the "LastName" column 1805. Similarly, items 1750 "martin" and 1755 "Martin" from FIG. 17 are grouped together in item 1835 in FIG. 18 after the hide operation, demonstrating that the grouping and sort operations are case-insensitive.

Once a grouping hierarchy has been established, users might wish to aggregate or summarise data by creating an aggregate column. FIG. 19 shows the visual result table 1900 produced after the user has applied a "sum" aggregate function to the "PurchaseAmount" column 1730 of FIG. 17. In a preferred implementation, the user may achieve this by right-clicking the mouse 103 and corresponding pointer on the column "PurchaseAmount" 1730 and selecting an appropriate entry from a context menu. When the user performs this action, step 310 in the method described in FIG. 3 receives user input. Step 315 first determines that the user has requested that the selected column 1730 be aggregated with a "sum" function and step 325 processes the analysis command.

Figure 20:
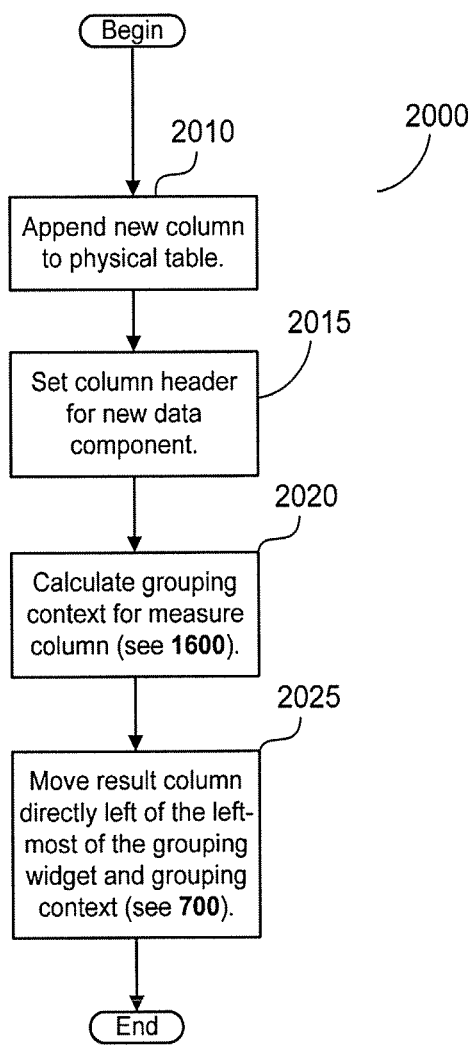
FIG. 20 is a flowchart for a method employed by the data analysis module after a new aggregate function has been applied by the user to the visual result table of FIG. 19.

Step 325 invokes the method 2000 described in the flowchart of FIG. 20 to process the analysis command. Step 2010 appends an empty column to the physical data table. The column mappings array, exemplified by 2840, is also grown by one in size to take the new aggregate column into account. Initially, this new logical column appended to the end of the column mappings array exemplified by 2840 maps to the new aggregate column. The aggregate values themselves remain uninitialised until the row mappings are updated in step 330, since the row mappings affect the aggregate values. Then, step 2015 sets the column header for the new column. The generated column header may desirably be a combination of the name of the function and the name of the measure column. For the example given, the system 200 generates the name "sum_PurchaseAmount" for the aggregate column to appear as 1915. The aggregate values of the column 1915 represent an example transformation of the data values in the existing column 1920 and represents a grouping context of that data. Such transformation may include or be extended to include any one or more of the functions described above, or other functions or data transformations. Because the aggregate values are based on the aggregate column's logical position in the data table, it is important to move the aggregate column, to appear as 1915, to the correct position before the values are generated. In a preferred implementation, the aggregate column is moved so that it appears after the measure column's left-closest grouping column. It makes sense to move the column left of a grouping column since a summary aggregate value is produced for each group. Step 2020 then calculates the grouping context for the measure column. The grouping context for a logical column x is defined as the first non-aggregate logical column encountered when iterating left through the logical columns, starting from the logical column directly left of logical column x. The aggregate column 1915 becomes a destination group context of the aggregate of values in the column 1920.

Figure 16:
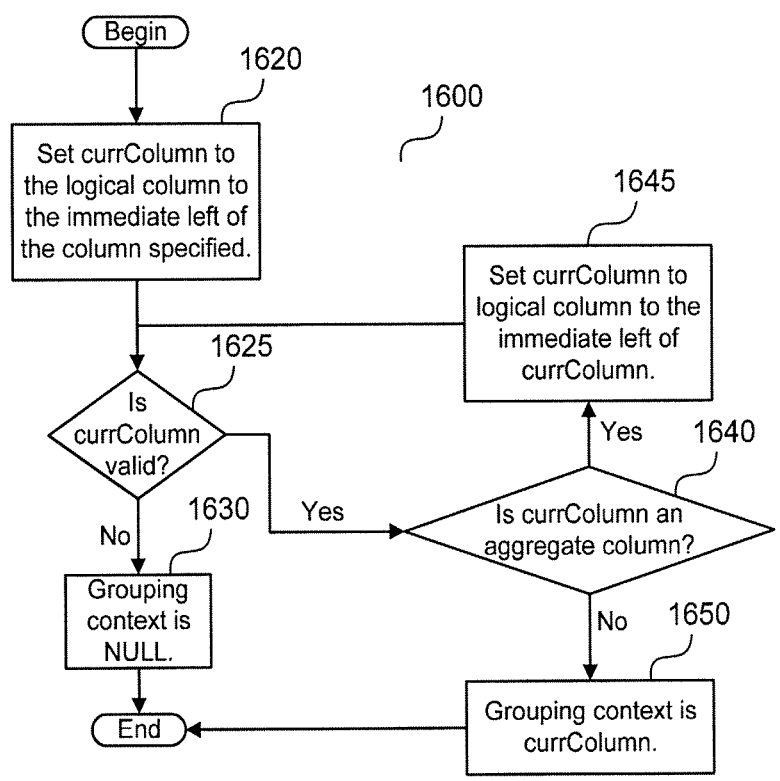
FIG. 16 is a flowchart of a method employed by the data analysis module to determine the grouping context for a column.

A method 1600 is used to determine the grouping context is shown in FIG. 16, and may now be described. For the measure column "PurchaseAmount", to appear as column 1920, step 1620 initialises the variable currColumn to be the "City" column to appear as column 1960, since the "City" column appears directly left of the measure column in FIG. 19. Flow continues to step 1625, where currColumn is checked for validity. This checks whether currColumn is NULL. In our example, currColumn is not NULL, so the test at 1625 returns true and flow continues through to step 1640. Since currColumn is also not an aggregate column, the test at 1640 returns false and step 1650 returns currColumn as the grouping context. Steps 1630 and 1645 will be explained in a later example. For the current example, control returns to step 2020 in FIG. 20, with the "City" column, to appear as 1960, being the determined grouping context. Step 2025 then tests whether the grouping context calculated in step 2020 is left of the grouping widget, to appear as 1905. If it is, it is a grouping column and the aggregate column is moved so that it appears after the grouping widget in the visual result table. Otherwise, the column is inserted directly before the grouping widget. Since the "LastName" column, to appear as 1960, appears to the right of the grouping widget 1905 in FIG. 19, the new aggregate column, to appear as 1915, is moved directly before the grouping widget, to appear as 1905. To move the aggregate column, the previously-described method 700 illustrated in FIG. 7 is invoked. Flow then continues back to step 325 in FIG. 3 and continues through to step 330.

Step 330 first invokes the previously-described method 800 illustrated in FIG. 8 to update the column mappings. Step 330 then invokes the previously-described method 900 illustrated in FIG. 9 to update the row mappings. Step 904 resets the row mappings as previously described. Step 906 then divides the filter list 2820 into two lists, one for pre-filters and the other for post-filters. The user has still not applied any filters in our example, so the pre-filter list and the post-filter lists will still both be empty at the end of step 906. Step 908 then processes the pre-filter list. Step 908 is shown in more detail in FIG. 10.

In step 1010 the previously-described variables i and n are both initialised to zero. Therefore, the condition at step 1015 returns false, and flow continues through to step 1030. Steps 1020 and 1025 will be described in a later example involving pre-filters. Step 1030 operates as previously described for the case whose result is shown in visual result table 600. Flow then continues through to step 1035.

Unlike previous examples, the user has now defined an aggregate column. Step 1035 is responsible for updating the values in all aggregate columns. This process is described in more detail in the method 1400 of FIG. 14. First, step 1440 iterates through all the physical columns in the physical data table, exemplified by 2810. If the physical column is an aggregate column, a flag is set indicating that it is "dirty" and that its values need updating. For the present case whose result is shown in visual result table 1900, the logical column to appear as column 1915 will be marked dirty and the rest will be marked as non-dirty. Flow then continues through to step 1445, where two variables i and n are initialised. Here, the variable i is the index of the logical column currently being processed by the method 1400, and is initialised to zero, whilst n is initialised to the total number of logical columns. For the case whose visual result is shown as the visual result table 1900 of FIG. 19, n is initialised to six. Since zero is less than six, the test at step 1450 returns true and flow continues through to step 1455. Step 1455 then initialises the variable col to point to the i'th logical column. Initially, this is therefore set to point to the first logical column that will appear in FIG. 19, the "FirstName" column 1950. The variable i is then incremented so that the next logical column will be processed during the next iteration of the loop. Step 1460 then updates col. The details of this are explained in the method 3000 of FIG. 30. For the "FirstName" column which will appear as item 1950 in FIG. 19, a test at step 3010 returns false, since only aggregate columns were marked as dirty in step 1440. Therefore, the method 3000 terminates and flow returns back to step 1460. Flow then returns back to step 1450.

Steps 1450, 1455 and 1460 will be repeated in the same manner for all columns which are not aggregate columns due to the fact that none will have been marked as dirty by step 1440. In the present example, when i equals 2, step 1455 sets col to point to the aggregate column which will appear as 1915 in FIG. 19. Because all aggregate columns were marked as dirty, the consequential test at step 3010 (via step 1460) returns true, and flow continues through to step 3020. col is an aggregate column, which depends on its measure column, to appear as column 1920 in FIG. 19. Therefore, step 3020 involves a recursive call to the method 3000 illustrated in FIG. 30, this time requesting that the values in the measure column, to appear as 1920, be updated. Step 3020 is necessary so that the values in the measure column are not themselves dirty. This is important in the case where an aggregate column's measure column is itself an aggregate column which has been marked as dirty. In the example given, the measure column, to appear as 1920, is not an aggregate column, and therefore not marked dirty. Therefore, the test at step 3010 in the recursive call returns false and flow returns back to step 3020 in the calling procedure. Flow continues to step 3035, where the values for the aggregate column col are updated. The method for updating the values in the aggregate column is described in detail in FIG. 15, which will be described later. Finally, step 3040 marks the aggregate column as not dirty and processing returns back to step 1460 in FIG. 14.

Figure 15:
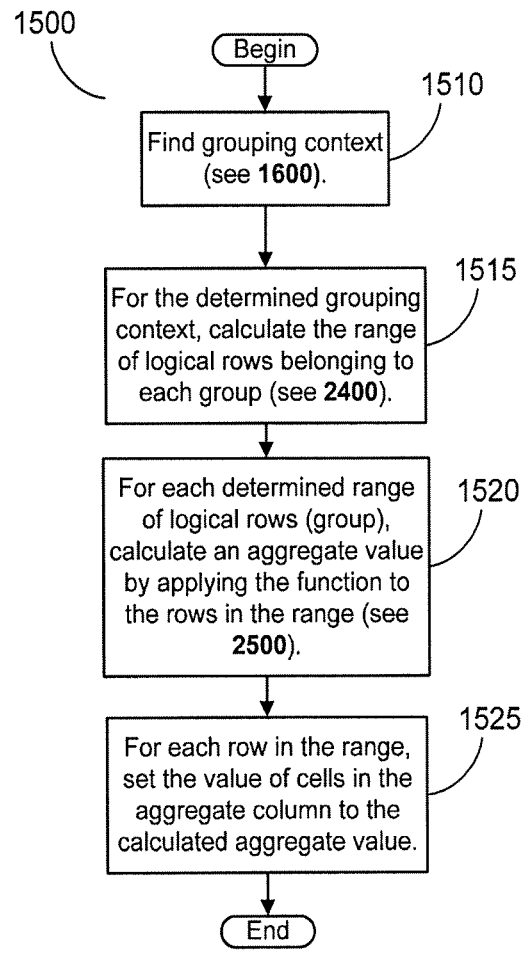
FIG. 15 is a flowchart of a method employed by the data analysis module to calculate aggregate values for an aggregate column.
Figure 30:
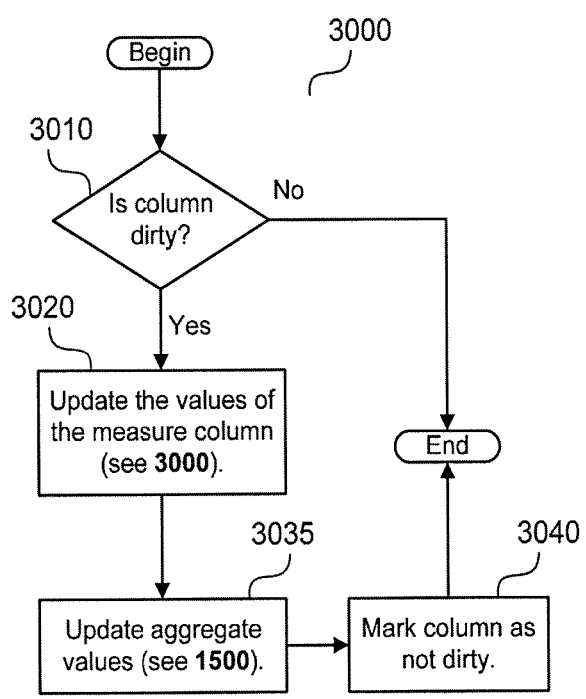
FIG. 30 shows a flowchart for a method employed by the data analysis module to update the values contained in an individual aggregate column.

Called from step 3035 in FIG. 30, the method illustrated in FIG. 15 describes updating the aggregate values in a single aggregate column. Step 1510 calculates the grouping context for the aggregate column, calling on the previously-described method illustrated in FIG. 16 to perform the calculation. Step 1510 determines that the "LastName" column, to appear as 1910, is the grouping context for the aggregate column to appear as 1915. Flow then continues through to step 1515.

Given the determined grouping context from step 1510, step 1515 calculates the range of logical rows which apply to each group. A method 2400 employed to perform this task is described in FIG. 24. In step 2405, the grouping context calculated in step 1510 is checked to see whether it is NULL. For the present case whose result in visual result table 1900, the test at step 2405 returns false, since the grouping context is the "LastName" column, to appear as column 1910, and therefore not NULL. In step 2410, some variables are initialised, namely startRow, endRow, n and rowRangeList. The variable startRow is the index of the logical row of the start of the range currently being processed, and is initialised to one. The variable endRow is the index of the end of the range currently being processed and is also initialised to one. The variable n is initialised to the total number of logical rows. For the present case whose result is shown in the visual result table 1900, n is initialised to sixteen. The variable rowRangeList accumulates the list of row ranges so that they can be returned to the calling method, and is simply initialised as an empty list. Flow then continues through to step 2420. Since one is less than fifteen, endRow is less than n−1 and the test at step 2420 returns true. Flow then continues to step 2425, where endRow+1 is tested to see whether it is a grouping row break in the grouping context column or the aggregate column is directly to the right of the grouping widget. Since the aggregate column to appear as 1915 is not directly to the right of the grouping widget 1905, the second part of the test always returns false. The method employed to perform the first part of the check is shown in the previously-described FIG. 31.

For the grouping context "LastName" column to appear as 1910, logical row two is a grouping row break, since "Carn" appears at logical row two and signifies the beginning of a new group. Therefore, the test at step 2425 returns true and flow continues through to step 2435. Step 2435 first adds a range [startRow, endRow] to rowRangeList. For the case whose result is visual result table 1900, the range added is [1, 1]. The variable startRow is then set to endRow+1, which is two in the example being described. Flow continues through to step 2430 where endRow is also incremented. In the present case whose result is visual result table 1900, endRow is now also equal to two. Flow then returns to step 2420. Since two is still less than fifteen, the test at step 2420 returns true and flow continues to step 2425. Logical row three is not a grouping row break for the grouping context "LastName" column to appear as 1910. Therefore, the test at step 2425 returns false and flow continues directly to step 2430, where endRow is again incremented before control is transferred back to step 2420. Steps 2420 to 2435 are repeated until all logical rows have been processed. At this point the condition at step 2420 will return false and flow will continue through to step 2440. At this point, the last range has not been added to rowRangeList so the range [startRow, n+1 ] is appended by step 2440. In the present case, whose result is shown in visual result table 1900, step 2440 appends the range [13, 15]. Step 2440 then returns rowRangeList to the caller at step 1515 in FIG. 15. Flow then continues through to step 1520.

Figure 25:
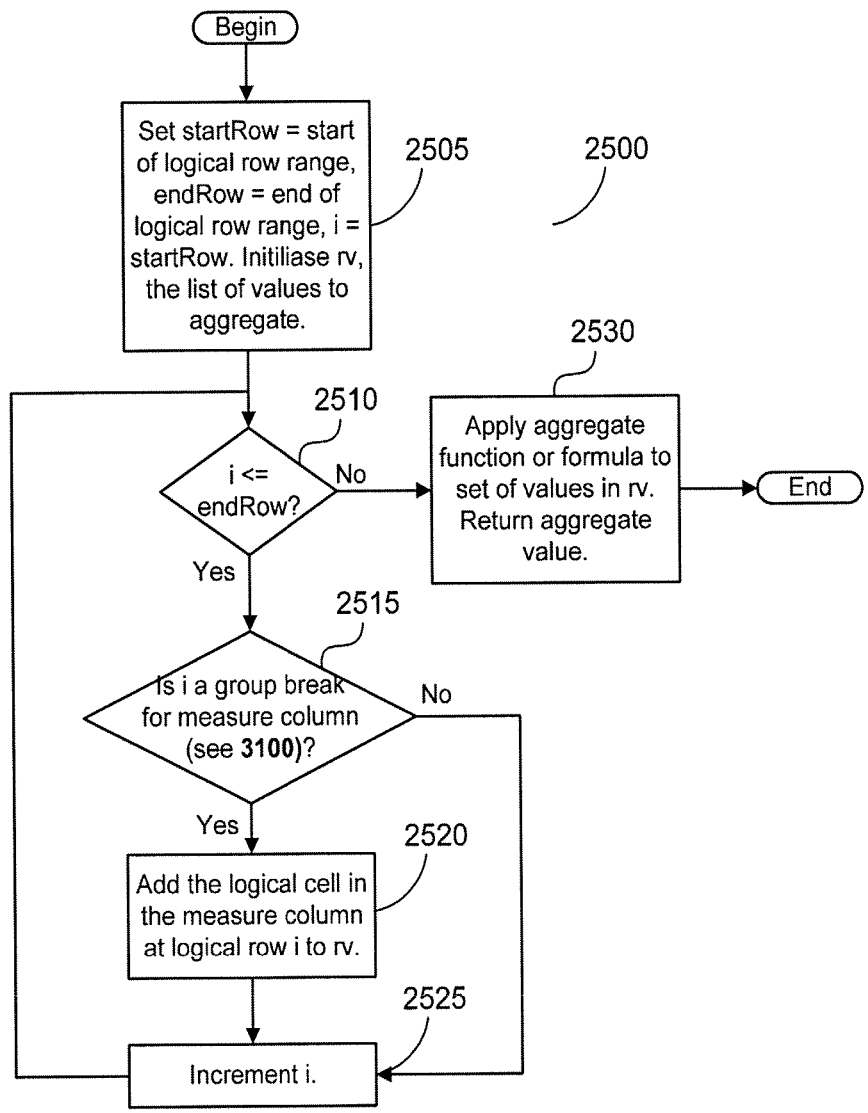
FIG. 25 is a flowchart of a method employed by the data analysis module to calculate the aggregate value for a given logical row range calculated using the method of FIG. 24.

Step 1520 calculates an aggregate value for each logical row range determined in step 1515 by applying a method 2500 shown in FIG. 25 to each member range of the list returned by step 1515. In step 2505, some variables are initialised, namely, startRow, endRow, i and rv. The variable startRow is the logical row number of the start of the range currently being processed, and is initialised to the start row of the member range passed to this method by step 1520. Likewise, the variable endRow is the logical row number of the end of the range currently being processed and is initialised to the logical end row of the member range passed to this method by step 1520. Here, the variable i is initialised to startRow and represents the current row being processed within the member range passed to this method by step 1520. The list variable rv contains the list of values to be aggregated. It is initialised as an empty list. As a means of demonstration, the row range [8,10] is passed by step 1520 to the method 2500 of FIG. 25. This corresponds to the group 1925 in the grouping context column which appears as 1910 in FIG. 19. For this example of row range [8, 10], i is initialised to eight, startRow is initialised to eight and endRow is initialised to ten. The test at step 2510 returns true, since eight is less than or equal to ten. Therefore, flow continues through to step 2515. Step 2515 determines whether the logical row i is a grouping row break in the measure column. The test at step 2515 is present so that aggregate functions whose measure columns are grouping columns aggregate only the values which will be visible in the resultant visual result table. For the aggregate column to appear as column 1915 in FIG. 19, the measure column is the column to appear as 1920 in FIG. 19. Since the measure column is not a grouping column, the previously-described method shown in FIG. 31 will always return true. Therefore, the test at step 2515 returns true, and flow continues through to step 2520. Step 2520 adds the logical cell in the measure column at logical row i to the list of values to be aggregated, rv. For the example being described, i equals eight and the measure column is the column to appear as 1920 in FIG. 19. Therefore, the value contained in the logical cell to appear as item 1935 "255" is appended to rv. Flow then continues through to step 2525 where i is incremented to nine so that the next logical row in the range will be processed during the next iteration of the loop. Flow then returns back to step 2510. Steps 2510 through 2525 are repeated until the whole row range has been processed. In this case, i will be equal to eleven and the test at step 2510 will fail. The list rv now contains the values "255", "171", shown as item 1940 in FIG. 19, and "713", shown as item 1945 in FIG. 19. Flow then continues through to step 2530, which applies the selected aggregate function or formula to the values contained in rv. The aggregate column to appear as 1915 is an aggregate column whose aggregate function is a "sum" function. Therefore, for the example given, the values in rv are added together to give a final aggregate value. The calculation performed is "255+171+713", which yields an answer of "1139". This value is the calculated aggregate value. This aggregate value is returned to the calling method, flow returning back to step 1520. From FIG. 19, it is observed that the "PurchaseAmount" column 1920, if a "count function" were applied, such would reveal 15 entries. If a "count-distinct" function were applied, 12 distinct entries would be revealed, in view of the entries 23 and 67 each being replicated once.

Flow then continues to step 1525, which now sets the cells in the logical column to appear as 1915. Since two is the logical position at which aggregate column 1915 will appear in FIG. 19, step 1525 sets the logical cells corresponding to rows eight to ten in column two to the value "1139". The method then terminates and flow returns back to step 1035 in FIG. 10. This method also terminates and flow returns back to step 908 in FIG. 9. Flow then continues to step 910, where post-filters are processed as previously described. The method then terminates and flow returns back to step 330 in FIG. 3. Flow then continues to step 335, which draws the logical cells to a drawing surface of the display 114 to form the visual result table 1900. The method employed for drawing the visual result table 1900 is the same as that previously described for visual result table 600. The aggregate value 1930 is displayed in the visual result table only for logical row eight, since rows nine and ten do not constitute grouping row breaks, and are thus not drawn according to the algorithm previously described in FIG. 27.

Once the user has begun the process of analysing data, more operations can be applied by the user and the results evaluated. FIG. 21 shows the result 2100 of the user applying further operations to the visual result table 1900. In the visual result table 2100, an aggregate column "count_FirstName" 2105 has been applied by the user, implementing a count function thereby counting the number of elements in the column"FirstName" 2115. The column "FirstName" 2115 has, in turn, had a primary ascending sort operation applied by the user, as indicated by the sort indicator 2110. A further aggregate column "sum_sum_PurchaseAmount" 2120 has been added by the user, summing the entries in the column "sum_PurchaseAmount" 2135, which originally appeared as column 1915 in FIG. 19. That same column 2135 has had a secondary descending sort operation applied by the user, as indicated by the sort indicator 2130. Another aggregate column "sum_PurchaseAmount_1" 2145 has been added by the user, which, like column 2135, sums the entries in the "PurchaseAmount" column 2165, but appears directly right of the grouping widget 2140. A ternary ascending sort has also been applied by the user to the "PurchaseAmount" column 2165, as indicated by the sort indicator 2160. Finally, two filters have been applied by the user, one pre-filter and one post-filter. The post-filter dictates that the values in the "sum_PurchaseAmount" column 2135 must be greater than thirty. The pre-filter dictates that the values in the "PurchaseAmount" column 2165 must be greater than thirty. The aggregate functions have also been moved from their default positions by the user. The last operation applied by the user was the addition of the ternary ascending sort to the column to appear as "PurchaseAmount" column 2165. In a preferred implementation, the user may achieve this by right-clicking the mouse 103 and corresponding cursor on the column to appear as "PurchaseAmount" 2165 and selecting an appropriate entry from a context menu. Given the previously-described method shown in FIG. 3 and the last operation applied, a description can be given for how the final visual result table 2100 is produced.

When the user applies the ternary sort operation to the column to appear as column 2165, step 310 in the method described in FIG. 3 receives user input. Step 315 first determines that the user has requested the application of a sort operation. Step 325 processes this command by creating a sort object, exemplified by 2814. The created sort object contains a pointer such as 2816 to the column "PurchaseAmount" to appear as 2165, and the direction of the created sort object is marked as "ascending" This newly created sort object is appended to the sort list, exemplified by 2812. The sort list now contains three sort objects. The first object represents the primary sort applied to the column "FirstName" to appear as 2115. The second object represents the secondary sort applied to the column "sum_PurchaseAmount" to appear as 2135. The third object is the one created to represent the ternary sort just applied by the user. Flow then continues through to step 330, which updates row and column mappings to reflect the change in the sort list.

Step 330 first invokes the previously-described method 800 of FIG. 8 to update the column mappings. Step 330 then invokes the previously-described method 900 of FIG. 9 to update the row mappings. Step 904 resets the row mappings as previously described. Step 906 then divides the filter list 2820 into two lists, one for pre-filters and the other for post-filters. After step 906 is complete, the pre-filter list contains one filter object, exemplified by 2822, representing the filter "PurchaseAmount greater than 30" and the post-filter list also contains one filter object, representing the filter "sum_PurchaseAmount greater than 30". Step 908 then processes the pre-filter list. The operation of step 908 is shown in more detail in FIG. 10.

In step 1010 the previously-described variables i and n are initialised to zero and one respectively. Since zero is less than one, i is less than n and the test at step 1015 returns true. Flow then continues through to step 1020. Step 1020 increments the variable i and initialises another variable, filter, to the i'th element of the pre-filter list. For the case whose result is shown in visual result table 2100, the filter "PurchaseAmount greater than 30" contains one filter element with a pointer, exemplified by 2828, to the "PurchaseAmount" column to appear as 2165. The logical filter connector, exemplified by 2830, for the single filter element will be "AND". This is true for the first filter element in any filter, since complete filters must be combined with the "AND" connector. The filter predicate for the filter element, exemplified by 2832, will be "greater than". The filter value, exemplified by 2834, for the single filter element will be "30". The variable i is also incremented to one. Step 1025 then invokes the method 1200 described in FIG. 12 on filter.

Figure 12:
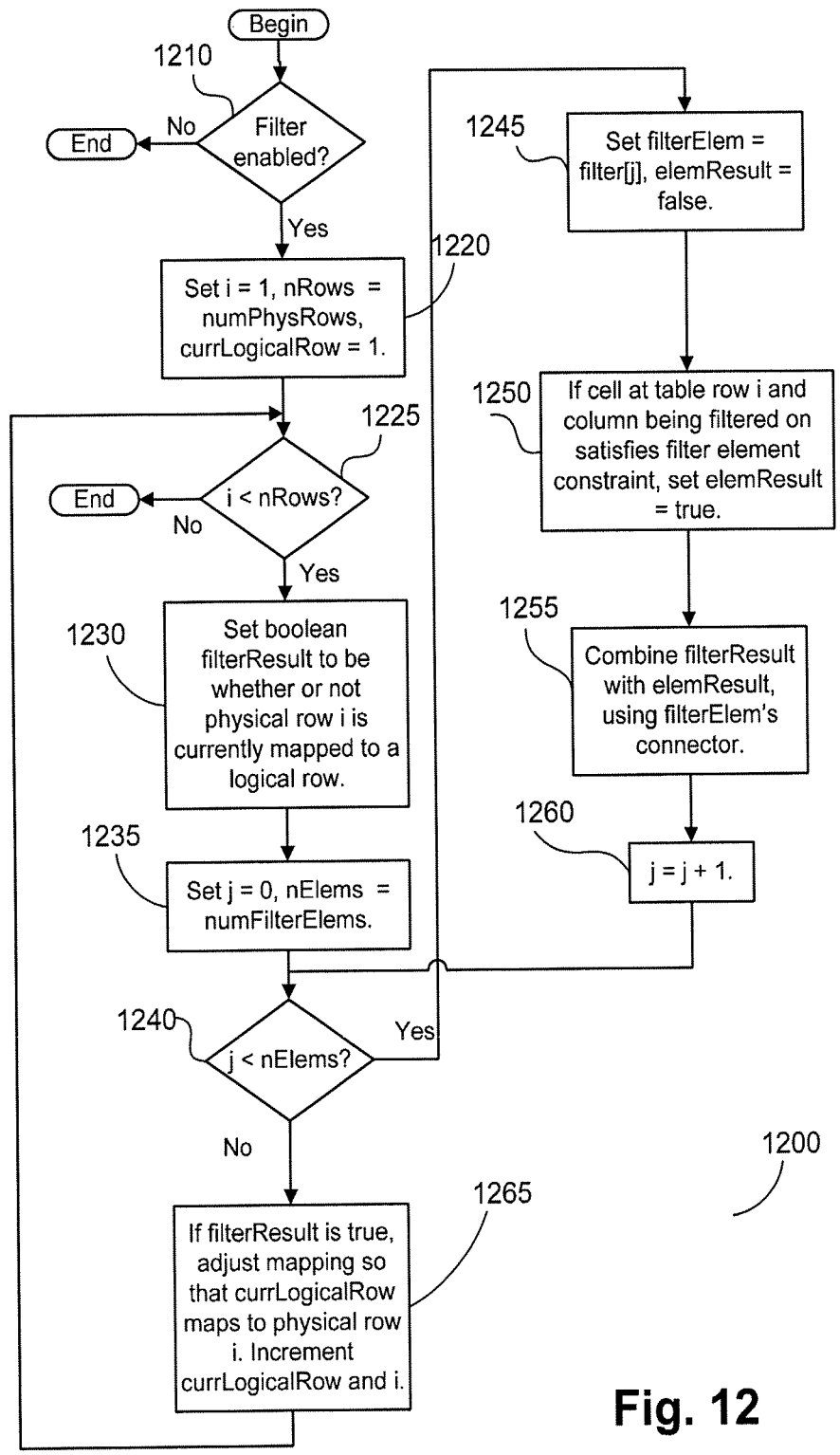
FIG. 12 is a flowchart of a method used to determine whether a given row in the physical data table satisfies the constraints described in an individual filter.

FIG. 12 illustrates the method employed to update the row mappings for an individual filter object. Step 1210 first checks whether a filter is currently enabled. Since the user has not disabled any filters, the test at step 1210 returns true and flow continues through to step 1220. If a filter has been disabled, the test at step 1210 returns false and the method described in FIG. 12 terminates immediately, returning control back to step 1025 in FIG. 10. In step 1220, some variables are initialised, namely i, nRows, and currLogicalRow. Here, the variable i is the physical row number currently being processed and is initialised to one since that represents the first physical row which is not a column header. The variable nRows is the number of physical rows in the physical data table. For the case whose result is shown in visual result table 2100, n is initialised to sixteen. The variable currLogicalRow is initialised to one and represents the current logical row that we are attempting to map a physical row to. One is less than sixteen, so i is less than nRows and the test at step 1225 returns true. Flow then continues through to step 1230. In step 1230, a Boolean value filterResult is initialised to true if there is currently a mapping from any logical row to the i'th physical row. It is set to false otherwise. Since the row mappings were reset in step 904 and no filters have been processed before this one, filterResult is initialised to true for the pre-filter specified in the case whose result is the visual result table 2100. In step 1235, some variables are initialised, namely j and nElems. Here, the variable j represents the index within the filter, exemplified by 2822, of the filter element, exemplified by 2826, currently being processed. Step 1235 initialised this to zero. The variable nElems represents the number of filter elements, exemplified by 2826, contained in the filter, exemplified by 2822. For the pre-filter in the case whose result is shown in the visual result table 2100, nElems is initialised to one. Since zero is less than one, j is less than nElems and the test at step 1240 returns true.

Flow then continues through to step 1245. Step 1245 initialises some more variables, namely filterElem, and elemResult. The variable filterElem is initialised to the filter element currently being processed by the method. Since j equals zero, filterElem is assigned to the first filter element in the filter being processed. For the example whose visual result is the visual result table 2100, filterElem is set to the first and only filter element of the pre-filter "PurchaseAmount greater than 30" The variable elemResult represents whether or not the physical row i satisfies the constraints imposed by filterElem. It is initialised to false, indicating that, by default, physical row i does not satisfy the constraints imposed by filterElem and will be filtered out. Step 1250 then determines if physical row i does, in fact, satisfy the constraints imposed by filterElem. Since i equals one and filterElem filters on the column "PurchaseAmount" to appear as 2165, we compare the filter value "30" with the physical data cell at row one in the column to appear as 2165. Since the visual result table 400 has had no analysis operations applied on it, it is a visual representation of the physical data table, exemplified by 2810.

From the visual result table 400, the cell at row one in the "PurchaseAmount" column 430 contains the value "255". Since "255" is greater than "30", physical row one satisfies the constraints imposed by filterElem. Therefore, the Boolean variable elemResult is set to true. Flow then continues through to step 1255, where filterResult is combined with elemResult using elemResult's logical filter connector, exemplified by 2830. The variable filterResult was initialised to true, and elemResult was set to true by step 1250 for the example pre-filter. Since filterElem is the first filter element in the example pre-filter and complete filters must be combined together with a logical 'AND' operation, the logical filter connector, exemplified by 2830, is equal to 'AND'. Therefore the Boolean variable filterResult is set to the result the evaluation of the Boolean expression "true AND true", which evaluates to "true".

Flow then continues through to step 1260, where j is incremented to one so that the next filter element in the filter can be processed during the next iteration of the loop encompassing steps 1240 through 1260. Since one is equal to one, the test at step 1240 returns false and flow continues through to step 1265. At this stage, if the variable filterResult is true, step 1265 creates a mapping by assigning the pointer at index currLogicalRow in the row mappings array, exemplified by 2842, to point to i. In the present example, this means the second element of the array, exemplified by 2842, will point to the second physical row. The variable currLogicalRow is then incremented. If filterResult is false, no mapping is created and currLogicalRow is not incremented. In both cases, the variable i is incremented so that the next physical row will be processed by the next iteration of the loop encompassing steps 1225 through 1265. The loop steps 1225 through 1265 are repeated until all physical rows have been processed. For the case whose visual result is visual result table 2100, i will equal sixteen when this occurs, and the test at step 1225 will return false, since sixteen is not less than sixteen. The method 1200 then terminates and control returns back to FIG. 10 at step 1025. Flow continues back to step 1015 where corresponding variable i is now one due to the increment operation performed in step 1020. The test at step 1015 now fails, since one is not less than one, and control flows through to step 1030, the operation of which is described in more detail in FIG. 13.

Steps 1310 through to 1320 proceed as described previously for the visual result table 600. In step 1360, the variable n is equal to three due to the three sorts in the sort list, exemplified by 2812. Since the variable i has been initialised to zero, the test at step 1360 returns true and flow continues through to step 1365. In step 1365, the variable sort is initialised, representing the current sort object, exemplified by 2814, being processed in the sort list. Since i was initialised to zero by step 1320, sort is initialised to the first sort object in the sort list. For the present case whose result is shown in visual result table 2100, sort is therefore assigned to the ascending primary sort applied to the column "FirstName", to appear as 2115. The variable i is also incremented to one by step 1365 so that the next sort object will be processed by the next iteration of the loop encompassing steps 1365 through 1395. Step 1370 then tests whether the sort operation represented by sort is being performed on an aggregate column. Since the column "FirstName", to appear as 2115, is not an aggregate column, the test at step 1370 returns false and flow continues through to step 1375. Step 1375 tests whether the sort operation represented by sort is being performed on a grouping column. Since the column "FirstName", to appear as 2115, is visible, left of the grouping widget and not an aggregate column, it is a grouping column and the test at step 1375 returns true. Flow then continues through to step 1395. Since a sort object for each grouping column has already been added to finalSortsList by step 1315, sort is not added to finalSortsList. Instead, the existing sort in finalSortsList whose member data column, exemplified by 2816, is also the member data column of sort, is updated. The update is performed by setting the existing sort's direction member, exemplified by 2818, to match the direction specified in sort.

Flow then returns back to step 1360. Since one is still less than three, the test at step 1360 returns true and flow continues through to step 1365. Step 1365 now initialises sort to the descending secondary sort applied to the column "sum_PurchaseAmount", to appear as 2135, and increments the variable i to a value of two. Since "sum_PurchaseAmount" is an aggregate column, the test at step 1370 returns true and flow continues through to step 1380. Performing a sort operation after a grouping operation has been performed would be pointless, since all aggregate values within a group have the same value. Therefore, it is necessary to ensure that the sort gets processed before the grouping occurs. This is achieved in two steps. First, step 1380 works out which column the aggregate values are grouped by. This is done by calculating the grouping context of the aggregate column using the method 1600 described in FIG. 16. The method 1600 has been previously described for the case whose result is visual result table 1900. For the aggregate column "sum_PurchaseAmount", to appear as 2135, the method described in FIG. 16 determines that the grouping column "LastName", to appear as 2125, is the grouping context. Secondly, since a sort object for each grouping column has already been added to finalSortsList by step 1315, step 1385 looks for the sort object whose member data column, exemplified by 2816, is equal to the grouping context calculated by step 1380. It then inserts sort into finalSortsList before this sort object.

Flow then returns back to step 1360. Since two is still less than three, the test at step 1360 returns true and flow continues through to step 1365. Step 1365 now initialises sort to the ascending ternary sort applied to the column "PurchaseAmount", to appear as 2165, and increments the variable i to a value of three. Since the column "PurchaseAmount" is not an aggregate column, the test at step 1370 returns false and flow continues through to step 1375. Since the column "PurchaseAmount", to appear as 2165, appears to the right of the grouping widget 2140, it is not a grouping column. Therefore, the test at step 1375 fails and flow continues through to step 1390. There, sort is appended to finalSortsList as it is desired to process this sort last, so that sorting occurs within each group.

Flow then returns back to step 1360, where the test returns false since three is not less than three. Flow then continues to steps 1350 and 1355, the operation of which have been previously described for the case whose visual result table is shown in FIG. 6. Finally, this method terminates and flow returns back to step 1030 in FIG. 10. Flow then continues through to step 1035.

Figure 14:
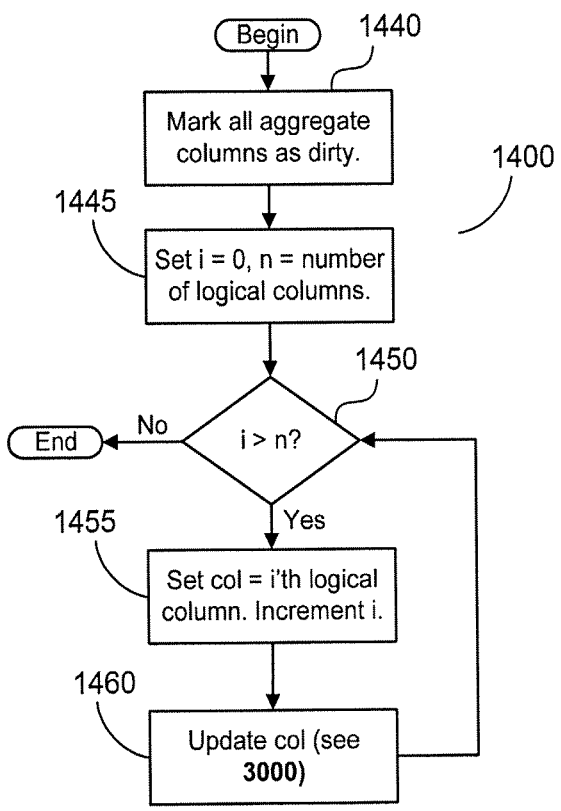
FIG. 14 is a flowchart of a method employed by the data analysis module to update the values contained in columns.

Step 1035 updates the aggregate values in all columns. It does this by calling the previously-described method 1400 shown in FIG. 14. The operation of FIG. 14 is the same as previously described, with a call to the previously-described method shown in FIG. 30 made to update each logical column. The aggregate column to appear as column 2120 illustrates the concept of an aggregate column whose measure column is also an aggregate column. In the case of the column to appear as 2120, the measure column is the column to appear as 2135, labelled "sum_PurchaseAmount". Therefore, the measure column will be dirty and the recursive call to update the measure column in step 3020 will not exit immediately due to the step 3010 failing.

As previously described, FIG. 30 then calls the method shown in FIG. 15 to update the aggregate values for the passed dirty aggregate column. In step 1510, the grouping context is calculating by invoking the previously-described method shown in FIG. 16. For the aggregate column to appear as 2105, step 1620 initialises the variable currColumn to NULL since there is no logical column to the left of the column to appear as 2105. Therefore, the test at step 1625 returns false, and flow continues through to step 1630, where a NULL grouping context is returned and flow returns back to step 1510 of FIG. 15. For the aggregate column to appear as 2145, step 1620 initialises the variable currColumn to point to the aggregate column to appear as 2135. The test at step 1625 returns true and flow continues through to step 1640. Since currColumn is an aggregate column, it is necessary to skip over it, and move further to the left. Therefore, the test at step 1640 returns true and flow continues through to step 1645. Step 1645 then sets the variable currColumn to point to the column to appear as 2125 and returns control back to step 1625. The test at step 1625 returns true and flow continues through to step 1640, where the test returns false. Flow then continues through to step 1650 where the column to appear as 2125 is returned as the grouping context to step 1510 in FIG. 15. Flow then continues to step 1515.

Figure 24:
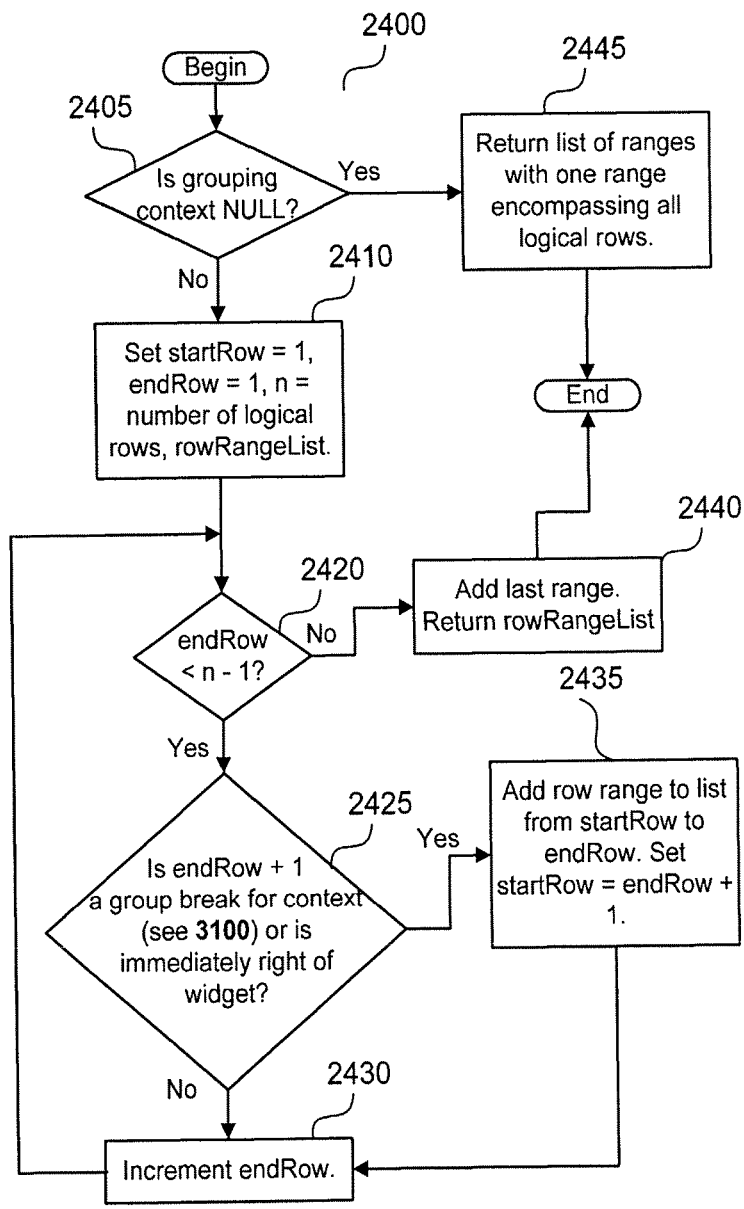
FIG. 24 is a flowchart of a method employed by the data analysis module to calculate the logical row ranges for each group.

As previously described, step 1515 then calls the method shown in FIG. 24 to calculate the range of logical rows belonging to each group, using the grouping context determined in 1510. The operation of the method in FIG. 24 is the same as previously described. However, one aggregate column "count_FirstName", to appear as column 2105, in visual result table 2100 has a NULL grouping context. This triggers a flow of control which has not yet been described. In the case of a NULL grouping context, the test at step 2405 returns true and flow continues through to step 2445. If the grouping context is NULL, aggregation should be performed on all the logical rows in the view (excluding logical row zero, which contains the column headers). Therefore, step 2445 returns a list of logical row ranges which contains exactly one range. That range will start at logical row one and finish at the number of logical rows minus one. In the case of the aggregate column to appear as 2105, the range calculated and returned is [1, 13]. Flow then returns back to step 1520 in FIG. 15.

Steps 1520 and 1525 are then processed as previously described for the case whose visual result is shown in FIG. 19. Finally, the method terminates and control returns back to step 1035 of FIG. 10, which in turn returns control back to step 908 of FIG. 9.

Step 910 then processes the post-filter list, which contains one filter object. Step 908 is shown in more detail in the method 11 of FIG. 11. In step 1110, the previously-described variables i and n are initialised to zero and one respectively. Since zero is less than one, i is less than n and the test at step 1115 returns true. Flow then continues through to step 1120. Step 1120 initialises another variable, filter, to the i'th element of post-filter list. For the case whose result is shown in visual result table 2100, the filter "sum_PurchaseAmount greater than 30" contains one filter element with a pointer, exemplified by 2828, to the "sum_PurchaseAmount" column to appear as 2135. The logical filter connector, exemplified by 2830, for the single filter element is "AND". The filter predicate for the filter element, exemplified by 2832, will be "greater than". The filter value, exemplified by 2834, for the single filter element will be "30". The variable i is also incremented to one. Step 1125 then invokes the previously-described method illustrated in FIG. 12 on filter. Step 1130 then updates the aggregate values in all columns, calling the previously-described method illustrated in FIG. 14. Control then returns to step 1115, where the test returns false, since one is not less than one. The method then terminates and control returns back to step 910 of FIG. 9, which in turn returns control back to step 330 of FIG. 3. Step 335 then draws the visual result table 2100, using the previously described method illustrated in FIG. 27.

Once users are presented with the visual result table 2100 shown in FIG. 21, they can then move aggregate columns around. Moving aggregate columns around has the effect of changing the grouping context, and therefore changes the aggregate values by changing the set of values in the measure column that each aggregate value summarises. One scenario is where the "sum_sum_PurchaseAmount" column 2120 is moved by the user so that it appears before the "FirstName" column 2115. The result is the visual result table 2200 shown in FIG. 22.

FIG. 3 shows the method employed by the data analysis module 210 to generate the visual result table 2200 from the original visual result table 2100. In step 310, the data analysis module 210 waits for input. Based on this user input, step 315 determines that the user has requested a move operation. Therefore, the test at step 315 succeeds. Step 325 then processes the move operation, using the previously-described method illustrated in FIG. 7. Step 330 then updates the column mappings to reflect the user's move operation, using the previously-described method illustrated in FIG. 8. Step 330 also updates the row mappings to reflect the move operation, using the previously-described method illustrated in FIG. 9. Step 335 then draws the table to the drawing surface of the display 114 to give the visual result table 2200, using the previously-described method illustrated in FIG. 27.

The grouping defined by users is not static. At any point during the analysis, the grouping can be changed. One scenario is given by the user moving the column "City" 2205 left of the "count_FirstName" 2210. This has the effect of grouping everything in the view by city. The result is the visual result table 2300 shown in FIG. 23.

FIG. 3 also shows the method employed by the data analysis module 210 to generate the visual result table 2200 from the original visual result table 2100. In step 310, the data analysis module 210 waits for input. Based on this user input, step 315 determines that the user has requested a move operation. Therefore, the test at step 315 succeeds. Step 325 then processes the move operation, using the previously-described method illustrated in FIG. 7. Step 330 then update the column mappings to reflect the user's move operation, using the previously-described method illustrated in FIG. 8. Step 330 also updates the row mappings to reflect the move operation, using the previously-described method illustrated in FIG. 9. Step 335 then draws the table to the drawing surface to give the visual result table 2300, using the previously-described method illustrated in FIG. 27.

INDUSTRIAL APPLICABILITY

The arrangements described are applicable to the computer and data processing industries, and particularly for the viewing of data sourced from a database able to represented in a tabular manner.

The foregoing describes only some embodiments of the present invention, and modifications and/or changes can be made thereto without departing from the scope and spirit of the invention, the embodiments being illustrative and not restrictive.

For example, whilst the description of the system 200 is founded upon a database able to be represented by a tabular representation, such may be applied to generic hierarchical databases with, for example, may typically be represented by a tree-type representation formed of nodes and leaves. Specifically in a tree representation, aggregate values may be indicated adjacent corresponding nodes to which the values apply. Further, by moving a pointer or other designator from one node to another, such can be used to cause calculation of a desired function at that node for some subset of leaves corresponding to values equivalent to those found in the measure column. This may be functionally equivalent to the moving of columns in the above described implementations.

We claim:

1. A computer-implemented method of updating a display of a tabular representation, said method comprising the steps of:
   (i) generating a tabular representation of a set of data, said representation comprising a plurality of columns containing the set of data;
   (ii) grouping the set of data by grouping a plurality of identical rows in at least one column to form a plurality of groups in each column of the tabular representation, said grouping being based on data in at least one column of the tabular representation;
   (iii) generating an aggregate column in the tabular representation comprising aggregate data derived from an aggregate function applied to at least some of the set of data based on the grouping of the data in an existing column;
   (iv) displaying the tabular representation with the aggregate column of data;
   (v) moving the aggregate column in the tabular representation; and
   (vi) updating the display of the tabular representation,
   wherein vertically adjacent cells within the moved aggregate column are grouped according to grouping of vertically left adjacent data within a second column of the tabular representation adjacent the moved aggregate column, and wherein the aggregate data in the moved aggregate column is determined by applying the aggregate function to at least some of the set of data in the existing column selected according to the grouping of the data in the second column adjacent the moved aggregate column to calculate an aggregate value for each group in the aggregate column when the aggregate column is moved, wherein the vertically left adjacent data within the second column corresponds to the set of data in the existing column,
   wherein at least first and second columns of the tabular representation display a grouping hierarchy relationship, so that the first column is displayed to the left of the second column and occupies a higher position in the hierarchy than the second column.

2. The method according to claim 1 wherein step (ii) comprises detecting a user moving of a grouping indicator and grouping the set of data according to an order of said columns established by the moving.

3. The method according to claim 1 wherein step (ii) comprises moving a position of at least one said column in said tabular representation and grouping the set of data according to an order of said columns established by the moving.

4. The method according to claim 1 further comprising the step, after step (iii) of:
   (vii) repeating step (ii).

5. The method according to claim 1 further comprising the step, after step (v) of:
(viii) repeating steps (iii) and (iv).

6. The method according to claim 1 further comprising the step, before step (iii), of applying a filter function to the tabular representation to exclude from display certain data thereof.

7. The method according to claim 1 further comprising the step, before step (iii), of applying a sort function to the tabular representation to rearrange display of certain data thereof.

8. The method according to claim 1 wherein each of said method steps comprise reproducing said tabular representation upon a display device.

9. The method according to claim 8 wherein said set of data persists during execution of said method and said tabular representation varies the extent of said set of data reproduced via the display device.

10. A non-transitory computer readable storage medium encoded with a computer program executable to perform a method of updating the display of a tabular representation, said method comprising:
(i) generating a tabular representation of the set of data, said representation comprising a plurality of columns containing the set of data;
(ii) grouping the set of data by grouping a plurality of identical rows in at least one column to form a plurality of groups in each column of the tabular representation, said grouping being based on data in at least one column of the tabular representations;
(iii) generating an aggregate column in the tabular representation comprising aggregate data derived from an aggregate function applied to at least some of the set of data based on the grouping of the data in an existing column;
(iv) displaying the tabular representation with the aggregate column of data;
(v) moving the aggregate column of data in the tabular representation; and
(vi) updating the display of the tabular representation, wherein vertically adjacent cells within the moved aggregate column are grouped according to grouping of vertically left adjacent data within a second column of the tabular representation adjacent the moved aggregate column, and wherein the aggregate data in the moved aggregate column is determined by applying the aggregate function to at least some of the set of data in the existing column selected according to the grouping of the data in the second column adjacent the moved aggregate column to calculate an aggregate value for each group in the aggregate column when the aggregate column is moved, wherein the vertically left adjacent data within the second column corresponds to the set of data in the existing column,
wherein at least first and second columns of the tabular representation display a grouping hierarchy relationship, so that the first column is displayed to the left of the second column and occupies a higher position in the hierarchy than the second column.

11. Computer apparatus for updating a display of a tabular representation applying a function to a set of data, said apparatus comprising:
a memory storing the set of data;
a display for displaying a tabular representation of a set of data, said representation comprising a plurality of columns containing the set of data; and
a processor configured for:
detecting a user input associated with a grouping of the set of data by grouping a plurality of identical rows in at least one column to form a plurality of groups in each column of the tabular representation, said grouping being based on data in at least one said column of the tabular representation;
generating an aggregate column in the tabular representation comprising aggregate data derived from an aggregate function applied to at least some of the set of data based on the grouping of the data in an existing column;
displaying the tabular representation with the aggregate column of data;
moving the aggregate column of data in the tabular representation; and updating the display of the tabular representation,
wherein vertically adjacent cells within the moved aggregate column are grouped according to grouping of vertically left adjacent data within a second column of the tabular representation adjacent the moved column, and wherein the aggregate data in the moved aggregate column is determined by applying the aggregate function to at least some of the set of data in the existing column selected according to the grouping of the data in the second column adjacent the moved aggregate column to calculate an aggregate value for each group in the aggregate column when the aggregate column is moved,
wherein the vertically left adjacent data within the second column corresponds to the set of data in the existing column,
wherein at least first and second columns of the tabular representation display a grouping hierarchy relationship, so that the first column is displayed to the left of the second column and occupies a higher position in the hierarchy than the second column.

* * * * *